(12) United States Patent
Py et al.

(10) Patent No.: US 8,071,009 B2
(45) Date of Patent: *Dec. 6, 2011

(54) STERILE DE-MOLDING APPARATUS AND METHOD

(75) Inventors: Daniel Py, Larchmont, NY (US); Benoit Adamo, Brookfield, CT (US); John Guthy, Southbury, CT (US); Nathaniel Houle, Hebron, CT (US); Giovanni Rodriguez, Stamford, CT (US)

(73) Assignee: Medical Instill Technologies, Inc., New Milford, CT (US)

( * ) Notice: Subject to any disclaimer, the term of this patent is extended or adjusted under 35 U.S.C. 154(b) by 623 days.

This patent is subject to a terminal disclaimer.

(21) Appl. No.: 11/582,291

(22) Filed: Oct. 17, 2006

(65) Prior Publication Data

US 2007/0114690 A1    May 24, 2007

Related U.S. Application Data

(60) Provisional application No. 60/727,899, filed on Oct. 17, 2005.

(51) Int. Cl.
*B29C 45/04* (2006.01)
(52) U.S. Cl. .................................. 264/328.11; 264/334
(58) Field of Classification Search ........................ None
See application file for complete search history.

(56) References Cited

U.S. PATENT DOCUMENTS

| 3,911,640 | A | 10/1975 | Rausing | 53/426 |
| 3,918,868 | A | 11/1975 | Villaume | |
| 4,079,850 | A | 3/1978 | Suzuki et al. | 215/12.2 |

(Continued)

FOREIGN PATENT DOCUMENTS

FR    2509689    7/1981

(Continued)

OTHER PUBLICATIONS

International Search Report and Written Opinion of the International Searching Authority for International Application No. PCT/US06/41002, 2007.

(Continued)

*Primary Examiner* — Monica A Huson
(74) *Attorney, Agent, or Firm* — McCarter & English, LLP

(57) ABSTRACT

An apparatus and method are provided for molding sterile parts. The apparatus has a first mold portion and a second mold portion. At least one of the first and second mold portions defines a mold cavity configured to receive a molten plastic and form therefrom at least one molded part At least one of the first and second mold portions is movable relative to the other between (i) a closed position for sealing the mold cavity or cavities and molding at least one part therein, and (ii) an open position defining a fluid passageway between the first and second mold portions and permitting the passage of a fluid sterilant therein. A fluid source that contains or otherwise generates a fluid sterilant, such as vaporized hydrogen peroxide, is connectable in fluid communication with the fluid passageway for introducing the sterilant into the fluid passageway with at least one of the first and second mold portions in the open position, and in turn contacting with the sterilant the surfaces of the first and second mold portions forming the fluid passageway and located adjacent to the at least one mold cavity, but not contacting an interior surface of a molded part within the mold cavity, to sterilize the exposed mold surfaces and thereby prevent contamination of the molded part.

8 Claims, 16 Drawing Sheets

U.S. PATENT DOCUMENTS

| | | | | |
|---|---|---|---|---|
| 4,134,300 A | 1/1979 | Svensson | | 73/864.52 |
| 4,208,852 A | 6/1980 | Pioch | | 53/167 |
| 4,401,423 A | 8/1983 | Bellehache et al. | | |
| 4,419,323 A | 12/1983 | Winchell | | 264/523 |
| 4,543,770 A | 10/1985 | Walter et al. | | 53/511 |
| 4,627,221 A | 12/1986 | Buchner | | |
| 4,628,969 A | 12/1986 | Jurgens | | 141/1 |
| 4,815,619 A | 3/1989 | Turner et al. | | 215/248 |
| 5,000,804 A | 3/1991 | Nugent | | 156/85 |
| 5,037,597 A | 8/1991 | McMinley et al. | | 264/238 |
| 5,067,532 A | 11/1991 | Lang et al. | | 141/329 |
| 5,129,212 A | 7/1992 | Duffey et al. | | 53/426 |
| 5,141,430 A | 8/1992 | Maus et al. | | |
| 5,341,854 A | 8/1994 | Zezulka et al. | | 141/1 |
| 5,344,036 A | 9/1994 | Stanescu et al. | | 215/251 |
| 5,353,573 A | 10/1994 | Durrant | | 53/410 |
| 5,431,201 A | 7/1995 | Torchia et al. | | 141/98 |
| 5,597,530 A | 1/1997 | Smith | | 422/28 |
| 5,601,214 A | 2/1997 | Hendrickson | | 222/517 |
| 5,641,004 A | 6/1997 | Py | | 141/3 |
| 5,669,208 A | 9/1997 | Tabaroni et al. | | 53/559 |
| 5,687,542 A | 11/1997 | Lawekci | | 53/428 |
| 5,744,082 A | 4/1998 | Bak | | 425/556 |
| 5,953,884 A | 9/1999 | Lawecki et al. | | |
| 6,065,270 A | 5/2000 | Reinhard et al. | | 53/426 |
| 6,068,150 A | 5/2000 | Mitchell et al. | | 215/247 |
| 6,094,890 A | 8/2000 | Meichellon et al. | | 53/453 |
| 6,096,358 A | 8/2000 | Murdick et al. | | 426/399 |
| 6,119,433 A | 9/2000 | Kitahora et al. | | 53/167 |
| 6,134,866 A | 10/2000 | Schoenewolff et al. | | 53/561 |
| 6,145,277 A | 11/2000 | Lawecki et al. | | 53/428 |
| 6,145,688 A | 11/2000 | Smith | | 220/259 |
| 6,156,842 A | 12/2000 | Hoenig et al. | | 525/171 |
| 6,164,044 A | 12/2000 | Porfano et al. | | 53/471 |
| 6,165,402 A | 12/2000 | Gabbard et al. | | 264/255 |
| 6,189,292 B1 | 2/2001 | Odell et al. | | 53/425 |
| 6,263,641 B1 | 7/2001 | Odell et al. | | 53/425 |
| 6,308,847 B1 | 10/2001 | Andersson et al. | | 215/247 |
| RE37,471 E | 12/2001 | Jagger | | 53/282 |
| 6,326,010 B1 | 12/2001 | Sano et al. | | 424/400 |
| RE37,676 E | 4/2002 | Abrams et al. | | 425/556 |
| 6,364,864 B1 | 4/2002 | Mohiuddin et al. | | 604/410 |
| 6,475,435 B1 | 11/2002 | Taggart | | 422/33 |
| 6,536,188 B1 | 3/2003 | Taggart | | 53/425 |
| 6,568,439 B1 | 5/2003 | Se et al. | | 141/301 |
| 6,604,561 B2 | 8/2003 | Py | | 141/329 |
| 6,622,457 B2 | 9/2003 | Kurth | | 53/425 |
| 6,681,475 B2 | 1/2004 | Thibault et al. | | 29/511 |
| 6,684,916 B2 | 2/2004 | Py | | 141/2 |
| 6,779,318 B2 | 8/2004 | Wang | | 53/410 |
| 6,929,040 B2 | 8/2005 | Py | | 141/329 |
| 7,032,631 B2 | 4/2006 | Py | | 141/82 |
| 7,096,896 B2 | 8/2006 | Py | | 141/130 |
| 7,100,646 B2 | 9/2006 | Py et al. | | 141/329 |
| 7,111,649 B2 | 9/2006 | Py | | 141/11 |
| 7,168,149 B2 | 1/2007 | Kalemba et al. | | 425/556 |
| 7,243,689 B2 | 7/2007 | Py | | 141/2 |
| 7,270,158 B2 | 9/2007 | Py | | 141/130 |
| 7,490,453 B2 * | 2/2009 | Py et al. | | 53/452 |
| 2001/0010145 A1 | 8/2001 | Tawa et al. | | |
| 2002/0023409 A1 | 2/2002 | Py | | 53/426 |
| 2002/0171179 A1 | 11/2002 | Dundas et al. | | |
| 2003/0098286 A1 | 5/2003 | Bloom et al. | | 215/349 |
| 2003/0159750 A1 | 8/2003 | Py | | 141/2 |
| 2004/0060261 A1 | 4/2004 | Py | | |
| 2004/0256026 A1 | 12/2004 | Py | | 141/329 |
| 2005/0173020 A1 | 8/2005 | Py | | |
| 2005/0217211 A1 | 10/2005 | Py | | 53/426 |
| 2005/0220927 A1 | 10/2005 | Hansen | | |
| 2005/0223677 A1 | 10/2005 | Py | | 53/140 |
| 2006/0200968 A1 | 9/2006 | Thilly et al. | | 29/527.1 |

FOREIGN PATENT DOCUMENTS

| | | |
|---|---|---|
| GB | 500354 | 2/1939 |
| GB | 984149 | 2/1965 |
| JP | H06-45721 U | 6/1994 |
| WO | 02/49821 | 6/2002 |
| WO | 03/022313 | 3/2003 |
| WO | 2004/000100 | 12/2003 |
| WO | 2004/014778 | 2/2004 |

OTHER PUBLICATIONS

Supplementary European Search Report for European Patent Application No. EP 06 82 6337.

* cited by examiner

STERILE DE-MOLDING APPARATUS AND METHOD

CROSS-REFERENCE TO PRIORITY APPLICATION

This patent application claims priority on U.S. provisional patent application Ser. No. 60/727,899, filed Oct. 17, 2005, entitled "Sterile De-Molding Apparatus And Method", which is assigned to the Assignee of the present invention and is hereby incorporated by reference in its entirety as part of the present disclosure.

FIELD OF THE INVENTION

The present invention relates to apparatus and methods for molding aseptic or sterile parts, such as container assemblies having containers and stoppers for sealing openings in the containers, including polymeric stoppers that are needle penetrable for filling a closed container with a substance therethrough and that are laser resealable for laser resealing the needle penetrated region of the stopper, and more particularly, to apparatus and methods for molding, de-molding and assembling such parts under aseptic conditions.

BACKGROUND OF THE INVENTION

A typical aseptically filled container assembly, such as container assemblies for storing and dispensing medicaments, for example vaccines and pharmaceuticals, or foods and beverages, such as liquid nutrition products, includes a container or container body defining a storage chamber, a fill opening in fluid communication with the container or container body, and a stopper or cap for sealing the fill opening after filling the storage chamber to hermetically seal the medicament, food, beverage or other substance within the container. In order to fill such prior art containers with a sterile fluid or other substance, it is typically necessary to sterilize the unassembled components of the dispenser or container, such as by autoclaving the components and/or exposing the components to gamma radiation. The sterilized components then must be filled and assembled in an aseptic isolator of a sterile filling machine. In some cases, the sterilized components are contained within multiple sealed bags or other sterile enclosures for transportation to the sterile filling machine. In other cases, the sterilization equipment is located at the entry to the sterile filling machine. In a filling machine of this type, every component is transferred sterile into the isolator, the storage chamber of the container is filled with the fluid or other substance, the sterilized stopper is assembled to the container to plug the fill opening and hermetically seal the fluid or other substance in the container, and then a crimping ring or other locking member is assembled to the container to secure the stopper thereto.

One of the drawbacks associated with such prior art container assemblies, and the processes and equipment for filling such container assemblies, is that the filling process is time consuming, and the processes and equipment are expensive. Further, the relatively complex nature of the filling processes and equipment can lead to more defectively filled containers than otherwise desired. For example, typically there are at least as many sources of failure as there are components. In many cases, there are complex assembly machines for assembling the containers that are located within the aseptic area of the filling machine that must be maintained sterile. This type of machinery can be a significant source of unwanted particles. Further, such isolators are required to maintain sterile air within a barrier enclosure. In closed barrier systems, convection flow is inevitable and thus laminar flow, or substantially laminar flow, cannot be achieved. When operation of an isolator is stopped, a media fill test may have to be performed which can last for several, if not many days, and can lead to repeated interruptions and significant reductions in production output for the pharmaceutical, nutritional or other product manufacturer that is using the equipment. In order to address such production issues, government-imposed regulations are becoming increasingly sophisticated and are further increasing the cost of already-expensive isolators and like filling equipment. On the other hand, governmental price controls and marketplace competition for pharmaceuticals and vaccines, including, for example, preventative medicines, and other aseptically filled products, such as liquid nutrition products, discourage such major financial investments. Accordingly, there is a concern that fewer companies will be able to afford such increasing levels of investment in sterile filling machines, thus further reducing competition in the pharmaceutical, vaccine, and nutritional product marketplaces.

Some prior art sterile filling machines and processes employ gamma radiation to sterilize the container components prior to filling and/or to terminally sterilize the containers after filling in cases where the product is believed to be gamma-radiation stable. One of the drawbacks of gamma sterilization is that it can damage or otherwise negatively affect the parts to be sterilized, such as by discoloring parts formed of plastic and other gamma-sensitive materials. In addition, if used to terminally sterilize filled containers, gamma radiation can damage the product stored within the container. Accordingly, gamma sterilization has limited applicability, and further, is not always a desirable form of sterilization for many types of products with which it is used.

Other prior art filling machines and processes employ fluid disinfectants or sterilizing agents or sterilants to sterilize the surfaces of the containers that will come into contact with the substance to be stored therein, such as foods or beverages. One such commonly used sterilant is vaporized hydrogen peroxide. In some such prior art filling machines and processes, the containers and stoppers are initially sterilized with a fluid sterilant, such as vaporized hydrogen peroxide. The open containers are then filled with the product to be contained therein, such as a food or beverage, and then the stoppers or caps are applied to the containers to seal the product within the container. One of the drawbacks of such prior art filling machines and processes is that the fluid sterilant, such as vaporized hydrogen peroxide, necessarily must contact and sterilize the interior surfaces of the containers. As a result, the interiors of the containers, and thus the products filled in the containers can contain vaporized hydrogen peroxide residue. This, in turn, can lead to peroxidation or the formation of free radicals that can alter or otherwise degrade the product formulation during its shelf life, or that otherwise can degrade the taste or other qualities of the product in the container.

Accordingly, it is an object of the present invention to overcome one or more of the above described drawbacks and disadvantages of the prior art.

SUMMARY OF THE INVENTION

The present invention is directed to an apparatus for molding aseptic or sterile parts, such as a container assembly having a container defining an opening in communication with an interior chamber for receiving a substance therein, and a stopper receivable within the opening for sealing the opening and substance received in the container. The apparatus comprises a first mold portion and a second mold portion, and at least one of the first and second mold portions defines a mold cavity configured to receive a molten plastic and form therefrom at least one part, such as at least one of the container and stopper. At least one of the first and second mold portions is movable relative to the other between (i) a closed position for sealing the mold cavity or cavities and molding at least one part therein, and (ii) a first or partially-open position defining a fluid passageway between the first and second mold portions and permitting the passage of a fluid therein. A fluid source containing at least one of a fluid disinfectant and sterilant, such as vaporized hydrogen peroxide, is connectable in fluid communication with the fluid passageway for introducing the sterilant into the fluid passageway with at least one of the first and second mold portions in the partially-open position, and in turn contacting with the sterilant at least one surface of the first and second mold portions located adjacent to the at least one mold cavity to sterilize the exposed mold surfaces and thereby prevent contamination of the at least one part to be molded. Preferably, the disinfectant or sterilant does not contact an interior surface of the part within the mold cavity, such as a container or stopper, to thereby prevent the collection of disinfectant or sterilant residue within the interior of the molded part.

In one embodiment of the present invention, one of the first and second mold portions includes a core pin, and the other of the first and second mold portions defines a cavity for receiving in the closed position the core pin of the other mold portion. Preferably, at least one of the first and second mold portions includes a plurality of core pins, and the other of the first and second mold portions defines a plurality of cavities for receiving in the closed position respective core pins.

In a currently preferred embodiment of the present invention, at least one of the first and second mold portions includes a port connectable in fluid communication between the fluid source and fluid passageway for allowing the flow of fluid from the fluid source therethrough. Preferably, at least one of the first and second mold portions is in fluid communication with at least one inlet port connectable in fluid communication with the fluid source for receiving fluid therefrom, and at least one outlet port connectable in fluid communication with the fluid passageway for allowing the flow of fluid from the fluid source through the inlet port, through the fluid passageway and, in turn, through the outlet port. In one currently preferred embodiment of the present invention, the sterilant generated by the fluid source is vaporized hydrogen peroxide. One such apparatus may further comprise at least one vacuum port connectable in fluid communication with the fluid passageway for drawing fluid from the fluid passageway therethrough. Also in this embodiment, a vacuum source is connectable in fluid communication with the vacuum port for drawing a vacuum through the vacuum port and, in turn, drawing fluid from the fluid passageway therethrough. In one embodiment of the present invention, the apparatus further comprises a cover extending between the first and second mold portions and substantially covering at least a peripheral portion of the fluid passageway when located in the partially-open position to retain the sterilant within the passageway prior to removal therefrom. Preferably, the cover is mounted on one of the first and second mold portions and is movable relative thereto. In another embodiment of the present invention, the apparatus further comprises a compressible gasket extending between the first and second mold portions in both the closed position and the first or partially-open position, and extending about a peripheral portion of the fluid passageway, to form a substantially fluid tight seal between the first and second mold portions in both the closed position and the first or partially-open position. In such embodiment, the compressible gasket is a hollow tubular gasket.

In one embodiment of the present invention, the apparatus further comprises a plate, such as a stripper plate, that defines at least one aperture receiving at least one core pin therethrough, and that is movable relative to the core pin in an open position for releasing the molded part, such as a container or stopper therefrom. Preferably, the plate defines at least one fluid-flow aperture therethrough for allowing the flow of fluid disinfectant or sterilant in the fluid passageway to flow through the plate and sterilize the fluid passageway.

Also in one embodiment of the present invention, the apparatus further comprises an assembly device located adjacent to the first and second molds and including at least one tool for manipulating the at least one molded part, such as a container, stopper and container and stopper assembly. At least one of the first mold, second mold and assembly device is movable relative to the others for assembling substantially sterile molded parts, such as a stopper and container into a sealed container and stopper assembly. The apparatus also comprises a source of sterile air or other gas in fluid communication with at least one of the first mold portion, second mold portion and assembly device for directing a substantially laminar flow and/or overpressure of sterile gas over the molded parts, such as a container and stopper, during assembly or other manipulation thereof. Preferably, although not always required, the gas source directs a substantially laminar flow of sterile gas over the molded parts during assembly or other manipulation thereof.

One embodiment of the present invention further comprises a needle filling and thermal resealing station including: (i) at least one needle that is movable between a first position for penetrating a stopper and introducing a substance from the needle therethrough and into the interior chamber of a container of a sealed empty sterile container and stopper assembly, and a second position spaced away from the stopper; and (ii) a thermal source for thermally sealing a needle penetrated region of the stopper upon withdrawal of the needle therefrom.

In one embodiment of the present invention, the apparatus further comprises a barrier surrounding at least one of the first mold portion, second mold portion and assembly device, and defining a substantially aseptic enclosure for assembling therein the stopper and container. In one such embodiment, the apparatus further comprises at least one of (i) a first barrier coupled to the first mold portion between at least a portion of the first mold portion and a molding machine, and preventing the passage of particles therebetween; (ii) a second barrier coupled to the second mold portion between at least a portion of the second mold portion and a molding machine, and preventing the passage of particles therebetween; and (iii) a third barrier coupled to the assembly device between a tool and a base portion of the assembly device and preventing the passage of particles therebetween.

The present invention also is directed to a method of molding aseptic or sterile parts, such as a container assembly having a container defining an opening in communication with an interior chamber for receiving a substance therein, and a stopper receivable within the opening for sealing the opening and substance received in the container. The method comprises the following steps:

(i) providing a first mold portion and a second mold portion, wherein at least one of the first and second mold portions defines a mold cavity configured to receive a molten plastic and form therefrom at least one molded part, such as at least one of the container and stopper, and at least one of the first and second mold portions is movable relative to the other;

(ii) introducing a molten plastic into the at least one mold cavity with the first and second mold portions in the closed position and forming at least one molded part therein, such as at least one of a container and a stopper;

(iii) moving at least one of the first and second mold portions from the closed position to a first or partially-open position defining a fluid passageway between the first and second mold portions and permitting the passage of fluid therein;

(iv) introducing at least one of a fluid disinfectant and sterilant into the fluid passageway and, in turn, into contact with at least one surface of the first and second mold portions located adjacent to the at least one mold cavity to at least one of disinfect and sterilize said surface of the mold and thereby prevent contamination of the respective molded part, such as a container and/or stopper; preferably, the disinfectant or sterilant does not contact an interior surface of the part within the mold cavity, such as the container or stopper, to thereby prevent the collection of disinfectant or sterilant residue within the interior of the molded part; and (v) de-molding from the at least one mold cavity the at least one molded part.

In a currently preferred embodiment of the present invention, the method further comprises directing a substantially laminar flow and/or overpressure of sterile gas over at least a portion of the first and second mold portions, and the at least one molded part during de-molding thereof. Preferably, the method further comprises providing at least one first and second mold portion defining a plurality of mold cavities, and at least one first and second mold portion including a plurality of core pins receivable within corresponding mold cavities, for molding a plurality of molded parts.

Also in a currently preferred embodiment of the present invention, the method further comprises substantially preventing the fluid disinfectant or sterilant from contacting interior surfaces of the respective molded parts, such as containers and stoppers. The method preferably further comprises introducing the fluid disinfectant or sterilant into the fluid passageway while the molded part is located within the respective mold cavity, and thereby substantially preventing the fluid sterilant from contacting interior surfaces of the respective molded part, such as a container or stopper, while simultaneously allowing the fluid sterilant to contact the surfaces of the first and second mold portions defining the fluid passageway and to sterilize them.

Also in a currently preferred embodiment of the present invention, the method further comprises drawing substantially all of the fluid disinfectant or sterilant out of the fluid passageway prior to de-molding the respective container or stopper. In one such embodiment, the method further comprises connecting a vacuum source in fluid communication with the fluid passageway and drawing with vacuum substantially all of the fluid disinfectant or sterilant out of the fluid passageway prior to de-molding the respective molded part. In another embodiment, an overpressure of sterile gas, such as heated sterile air, is used in lieu of or in conjunction with the vacuum source, to flush and otherwise remove substantially all of the fluid disinfectant or sterilant from the fluid passageway prior to de-molding the parts.

In a currently preferred embodiment of the present invention, the method further comprises covering or sealing at least a peripheral portion of the fluid passageway during introduction of the fluid disinfectant or sterilant therein to substantially retain the fluid disinfectant or sterilant within the fluid passageway and in contact with the surfaces of the first and second mold portions defining the fluid passageway. The method preferably further comprises retaining the fluid disinfectant or sterilant in the fluid passageway for a predetermined period of time sufficient to sterilize same, and then drawing the fluid disinfectant or sterilant from the fluid passageway prior to de-molding. Preferably, the method further comprises moving at least one of the first and second mold portions relative to the other to a second or more fully-open position, and de-molding the respective molded part(s) in the second or more fully-open position.

Also in a currently preferred embodiment of the present invention, the method further comprises providing an enclosure; directing a substantially laminar flow and/or overpressure of sterile gas within the enclosure to thereby define a sterile space within the enclosure; and de-molding the part(s) within the sterile space. The method preferably further comprises assembling with an automated assembly device within the sterile space of the enclosure the molded parts, such as a sterile container and stopper into a sealed, empty, sterile container and stopper assembly. Also in one embodiment of the present invention, the method further comprises needle penetrating the stopper, filling the container and stopper assembly therethrough, and thermally resealing the resulting needle hole in the stopper, within the sterile space of the enclosure.

One advantage of the apparatus and method of the present invention is that they may be configured to substantially prevent the fluid sterilant from contacting the interior surfaces of the molded parts, such as containers and stoppers (i.e., the surfaces defining the chambers for storing and contacting the product to be filled therein). These interior surfaces, on the other hand, are thermally sterilized at the time of formation by the introduction of molten plastic into the respective mold cavities. When the mold portions are located in the partially-open position defining the fluid passageway between the mold portions for receiving the fluid disinfectant or sterilant, the core pins are still received within the molded parts, such as the containers or stoppers, and/or the interior surfaces of the parts otherwise are substantially prevented from contacting the fluid disinfectant or sterilant. Since the interior surfaces of the molded parts are thermally sterilized at the time of formation by introducing the molten plastic into the respective mold cavities, there is no need for such surfaces to contact the fluid disinfectant or sterilant. As a result, the apparatus and method of the present invention may prevent the collection of fluid disinfectant or sterilant residue on the interior surfaces of the molded parts, thereby preventing such sterilant residue from contacting the products to be received within such parts, or otherwise preventing the collection of such residue, and obviating the problems associated with such residue encountered in the prior art.

Yet another advantage of the apparatus and method of the present invention is that the fluid disinfectant or sterilant sterilizes the surfaces of the mold that are not thermally sterilized by introduction of molten plastic into the mold, but that are located adjacent to the mold cavities to thereby prevent any germs or contaminants from collecting on such surfaces and, in turn, contaminating the molded sterile parts at the time of de-molding. A further advantage of the present invention is that the space between the mold portions is sterilized by the fluid disinfectant or sterilant, and when the mold portions are positioned in the fully-opened position for de-molding, the space between the mold portions is maintained aseptic or sterile by the substantially laminar flow of sterile gas through such space, thus enabling the assembly or other manipulation of the molded parts, such as containers and stoppers, in a sterile space, to thereby ensure the formation of sterile, sealed, empty container assemblies.

Yet another advantage of certain embodiments of the apparatus and method of the present invention is that the automated assembly device also is located within the aseptic or sterile space, and is maintained aseptic or sterile by the substantially laminar flow and/or overpressure of sterile gas through the space and over the assembly device to thereby maintain the assembly device aseptic or sterile and prevent contamination of the molded parts during assembly or other manipulation thereof.

A still further advantage of a currently preferred embodiment of the present invention is that the sealed, empty, sterile container assemblies may be needle filled and laser resealed in line with the molding thereof to produce sterile, filled, sealed container and stopper assemblies.

Other objects and advantages of the present invention and certain embodiments thereof will become more readily apparent in view of the following detailed description of the currently preferred embodiments and the accompanying drawings.

DETAILED DESCRIPTION OF THE PREFERRED EMBODIMENTS

Figure 1:
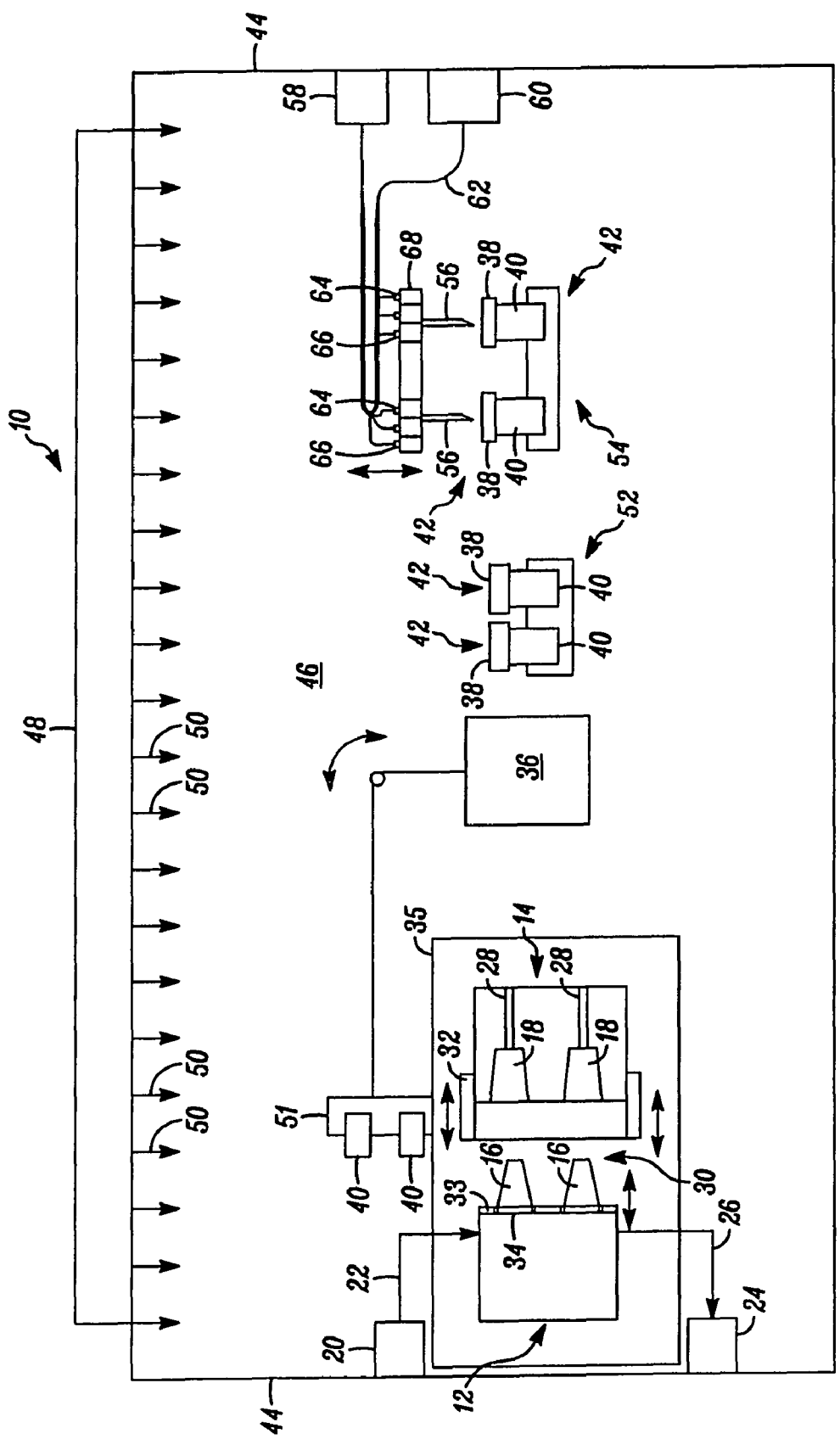
FIG. 1 is a schematic illustration of an apparatus embodying the present invention including a barrier enclosure with laminar flow and/or overpressure of sterile gas therethrough, and including within the enclosure first and second mold portions, a sterilant source for sterilizing the space between the mold portions prior to de-molding, a vacuum source for flushing the sterilant from between the mold portions prior to de-molding, a robotic assembly for receiving the de-molded parts, such as containers and stoppers, and assembling them into sterile, sealed, empty container and stopper assemblies, and a needle filling and laser resealing station for needle penetrating and filling the sealed container and stopper assemblies and laser resealing the resultant needle holes in the stoppers.

In FIG. 1, an apparatus embodying the present invention is indicated generally by the reference numeral 10. The apparatus 10 comprises a mold including a first mold half or portion 12, and a second mold half or portion 14. As indicated by the arrows in FIG. 1, at least one of the first and second mold portions 12 and 14 is movable relative to the other in a manner known to those of ordinary skill in the pertinent art between a closed position for molding the parts therein, and an open position for de-molding or releasing the molded parts therefrom. The first mold portion 12 defines a plurality of core pins 16 and the second mold portion 14 defines a plurality of corresponding cavities 18 for receiving therein the core pins 16. When the mold portions are located in the closed position, the core pins and mold cavities cooperate to define the mold cavity shapes for forming the parts therein, such as containers or stoppers. As may be recognized by those of ordinary skill in the pertinent art based on the teachings herein, each mold portion may define any number of mold cavities or core pins, or other mold structures, for forming any of numerous different parts in any of numerous different ways that are currently known or that later become known. In addition, the mold may comprise any desired number or configuration of components, including, for example, moving parts, such as any desired number or configuration of cavities, core pins or other hardware, as may be desired or otherwise required. Further, the apparatus may comprise any desired number of molds, including a mold for molding the containers, and a different mold to mold the stoppers. Alternatively, the containers and stoppers may be molded in the same molds. Unless otherwise indicated, the term "mold" is used herein to mean an apparatus or device defining one or more cavities in which one or more parts are shaped. The mold portions referenced herein may be defined by respective mold halves, mold plates, mold sides, or any of numerous other mold portions or structures that are currently known, or that later become known.

A fluid source 20 is coupled in fluid communication through a fluid line 22 to the first and second mold portions 12 and 14, and a vacuum source 24 is coupled in fluid communication through a vacuum line 26 to the mold. As indicated by the arrows in FIG. 1, at least one of the first and second mold portions 12 and 14, respectively, is movable relative to the other between a closed position for receiving the core pins 16 within the mold cavities 18 and sealing the mold cavities, and at least one open position with the two mold portions spaced relative to each other for de-molding the parts therefrom, such as containers or stoppers. In the closed position, molten plastic is injected or otherwise introduced through runners or other lines 28 into the mold cavities to form the parts. Because the plastic is introduced into the mold cavities in a molten state, the surfaces defining the mold cavities that come into contact with the plastic are thermally sterilized (or maintained sterile) by the molten plastic and flow of sterile gas when in the fully open position. Thus, immediately following formation of the plastic parts within the mold, and prior to opening the mold, the molded parts, such as the containers and stoppers, are sterile. In order to maintain the sterility of such parts, after introducing the molten plastic into the mold cavities and forming the respective parts therein, at least one of the first and second mold portions 12 and 14 is moved relative to the other into a first or partially-open position to define a relatively narrow fluid passageway 30 (FIG. 5) between the opposing faces of the mold portions. As shown in FIG. 1, the mold portions 12 and 14 include a movable barrier enclosure or cover 32 that is mounted on the second mold portion 14 and is movable relative thereto to cover or extend about the periphery of the space between the mold portions and thus enclose the fluid passageway defined by the space.

In the first or partially-open position, the fluid source 20 is actuated to deliver at least one of a fluid disinfectant and sterilant through the line 22 and into the fluid passageway 30 between the mold portions. In a currently preferred embodiment of the present invention, the fluid is a vaporized hydrogen peroxide sterilant that is introduced into the fluid passageway 30 and into contact with the surfaces of the mold portions defining the fluid passageway. The sterilant is introduced in sufficient quantity and/or concentration, and retained within the fluid passageway 30 for a sufficient period of time to ensure that the opposing surfaces of the mold portions defining the passageway are sterilized and/or maintained sterile. Then, the vacuum source 24 is actuated to draw or flush the sterilant out of the fluid passageway 30. After the sterilant is removed from the fluid passageway 30, at least one of the first and second mold portions 12 and 14 is moved relative to the other into a second or fully-open position such that the mold portions are further spaced relative to each other to allow de-molding or removal of the parts therefrom. Unless otherwise indicated, the terms "sterile" and "aseptic" are used herein synonymously to mean that the subject mold surfaces and molded parts are substantially free from germs of disease, fermentation or putrefaction, or otherwise are substantially free of pathogenic microorganisms. Similarly, the terms "disinfectant" or "sterilant" are used herein synonymously to mean a substance that renders, or facilitates in maintaining the subject mold surfaces aseptic or sterile.

As shown in FIG. 1, the first mold portion 12 includes a stripper plate 33 movably mounted thereon, and defining a plurality of apertures 34 for receiving therethrough the core pins 16. As described further below, the stripper plate 33 is moved outwardly relative to the first mold portion 12 to remove or de-mold the parts from the core pins 16. As may be recognized by those of ordinary skill in the pertinent art based on the teachings herein, any of numerous different fluid disinfectants or sterilants that are currently known or that later become known, equally may be used to sterilize the surfaces defining the fluid passageway prior to de-molding. Similarly, any of numerous different processes may be used to draw or flush out the disinfectant or sterilant from the fluid passageway prior to de-molding, if necessary, or otherwise desirable, such as by flushing an inert gas through the fluid passageway. As shown in FIG. 1, the first and second mold portions 12 and 14, respectively, are mounted within a molding machine 35, such as a plastic injection molding machine or other type of molding machine that is currently known, or that later becomes known for performing the function of the molding machine as disclosed herein. In addition, the apparatus of the present invention may include any desired number of molding machines.

An assembly device 36 is located adjacent to the first and second mold portions 12 and 14, respectively, and is movable relative thereto for assembling the molded substantially sterile stoppers 38 and containers 40 into sterile or aseptic, sealed container and stopper assemblies 42. The assembly device 36 may take the form of a robot including, for example, a base that extends upwardly from a mounting flange, a first robotic arm that is pivotally driven on the base, and a second robotic arm that is pivotally driven on top of the first robotic arm. Both robotic arms are pivotally driven within the X and Y coordinate plane. The robot preferably further includes a z-drive that is drivingly mounted on the second robotic arm and drivable in the z-axis. In one embodiment, the robot is a "SCARA" robot sold by Epson Corporation under the model designation "E2S SCARA", such as one of the "E2S clean robots" that is clean room capable (class 10 clean room, for example). One such model is sold by Epson under the model number "E2S451C". In another embodiment, the robot is a Staubli RX 90, or Staubli TX 90 CR, which are both 6-axis robots. However, as may be recognized by those of ordinary skill in the pertinent art based on the teachings herein, these robots are only exemplary, and the assembly device may take the form of any of numerous different robots or other assembly devices that are currently known or that later become known for performing the function of the assembly device 36 as described herein. In addition, the apparatus and/or method of the present invention may employ more than one robot or other assembly device to perform the functions performed by the assembly device 36 and/or to perform additional functions.

A barrier enclosure 44 of a type known to those of ordinary skill in the pertinent art surrounds or substantially surrounds the molding machine(s) 28 and defines an aseptic chamber 46. The relatively hot, sterile, stoppers and containers 38 and 40, respectively, are assembled within the aseptic chamber 46 prior to or upon de-molding, to form the sealed, sterile or aseptic stopper and container assemblies 42.

As also shown in FIG. 1, one or more laminar flow sources 48 are coupled in fluid communication with the aseptic chamber 46 for directing a substantially laminar flow 50 of sterile air or other gas(es) into the chamber 46 and over the stoppers 38 and containers 40 upon de-molding or removal from the mold and during assembly thereof to facilitate maintaining the sterility of the parts and otherwise to prevent any particles or other unwanted contaminants from entering the interior chambers of the containers 40. Each laminar flow source 48 may be mounted above the barrier enclosure 44 to direct the laminar flow 50 downwardly into the aseptic chamber 46, or the laminar flow source 48 may be mounted to one side of the barrier enclosure 44 to direct the laminar flow 50 laterally (or substantially horizontally) through the aseptic chamber 46. The laminar flow source(s) are preferably positioned to ensure that the desired surfaces of the mold and molded parts receive a flow of sterile gas thereon. In one embodiment of the present invention, each laminar flow source 48 includes a filter and a fan to produce a filtered airflow into the aseptic or clean enclosure 46. This filtered airflow causes the air pressure within the barrier 46 to be somewhat greater than the air pressure outside the barrier. This pressure differential helps minimize the possibility of airflow into the barrier enclosure, which in turn helps prevent (or at least limit) the possibility that contaminants will get into the barrier enclosure. In some embodiments, the filter is a high efficiency filter, such as a HEPA filter. Although a substantially laminar flow of sterile air or other gas is illustrated in FIG. 1, the flow need not be entirely laminar, and in fact, in many applications all that is required is an overpressure of such sterile air or other gas within the aseptic enclosure.

As shown in FIG. 1, the assembly device 36 includes an end-of-arm tool 51 for manipulating the containers 40, stoppers 38 and container and stopper assemblies 42. As can be seen, the tool 51 is movable by the assembly device 36 for assembling under the sterile laminar flow 50 within the aseptic space 46 the substantially sterile containers 40 and stoppers 38 into sterile sealed container and stopper assemblies 42.

A container transfer station 52 is mounted within the barrier enclosure 44 for receiving from the assembly device 36, or otherwise collecting therein the sealed container and stopper assemblies 42. The sealed container and stopper assemblies 42 then may be packaged, such as in trays or boxes, which in turn may be packaged in one or more bags (such as double or triple bags) in a manner known to those of ordinary skill in the pertinent art. Alternatively, the sealed container and stopper assemblies 42 may be fed directly from the transfer station 52 into a needle filling and thermal resealing station 54. The needle filling and thermal resealing station 54 may be located within the same barrier enclosure 44 (or aseptic chamber 46) as the mold portions 12, 14 and assembly device 36, or the transfer station and needle filling and thermal resealing station may be located within one or more separate barrier enclosures and aseptic chambers (not shown) that is/are connected to the first aseptic chamber 46 in order to transfer the sealed container and stopper assemblies 42 thereto.

The needle filling and thermal resealing station 54 may include any of the needle filling and thermal resealing apparatus as described in the below-mentioned patent and patent applications and incorporated by reference herein. Accordingly, as shown in FIG. 1, the needle filling and thermal resealing station 54 preferably includes at least one needle 56 coupled in fluid communication with one or more substance sources 58, such as a medicament, liquid nutrition product, or other substance to be contained within the container and stopper assemblies 42, and one or more pumps (not shown) for pumping the substance from the substance source, through the needle(s) 56 and into the container chambers; at least one thermal source, such as a laser source 60, fiber optic cables 62 and laser optic assemblies 64 for transmitting laser radiation onto the needle penetrated region of each stopper 38 for sealing the respective stopper after filling the container; and at least one temperature sensor 66, such as an IR sensor, for sensing the temperature of the sealed surface of each stopper 38 to ensure that the stopper is properly sealed. As indicated by the arrows in FIG. 1, the needles 56 are drivingly mounted on a manifold 68 and are movable into and out of engagement with the needle penetrable stoppers 38 of the container and stopper assemblies 42 transported through the needle filling and laser resealing station 54 to needle fill and laser reseal the container and stopper assemblies. As may be recognized by those or ordinary skill in the pertinent art based on the teachings herein, the needle filling and laser resealing station 54 may take the form of any of numerous different configurations that are currently known or that later become known. For example, the needle filling and laser resealing station 54 may include (i) a plurality of needle modules, each having mounted thereon a respective needle, wherein the plural needle modules are driven vertically on spaced supports between a first position for penetrating the stoppers of the container assemblies and introducing a substance from the needles therethrough and into the interior chambers of the container bodies, and a second position spaced away from the stoppers; and (ii) a plurality of laser sealing modules for thermally sealing the needle penetrated regions of the stoppers upon withdrawal of the needles therefrom. The container and stopper assemblies 42 may be mounted in cavities of respective holding devices which, in turn, are mounted on a sliding tray or other support. The tray in turn may be mounted on a linear magnetic actuator or an "endless" screw-type conveyor for driving the containers through the needle filling and laser resealing station. Alternatively, the container and stopper assemblies may be mounted on, and conveyed in any of numerous different ways that are currently known, or that later become known.

If desired, the apparatus 10 may further comprise (i) a first barrier (not shown) coupled to the first mold portion 12 and second mold portion 14 between at least a portion of each of the first and second mold portions 12 and 14, respectively, and the molding machine 35 that prevent the passage of particles therebetween; and (ii) a second barrier (not shown) coupled to the assembly device 36 between the end of arm tooling 51 and a base portion of the assembly device for preventing the passage of particles therebetween. Each barrier preferably is sealed by a respective elastomeric sealing member (not shown), such as a gasket, o-ring, or other type of sealing member that secures the barrier to the respective mold portion or assembly device, and forms a hermetic seal therebetween. If desired, each barrier may be made of a flexible material, and may take the form, for example, of a polymeric bag or like polymeric sheet. However, as may be recognized by those of ordinary skill in the pertinent art based on the teachings herein, these barriers are only exemplary, and numerous other types of barriers that are currently known, or that later become known, equally may be employed.

Figure 2:
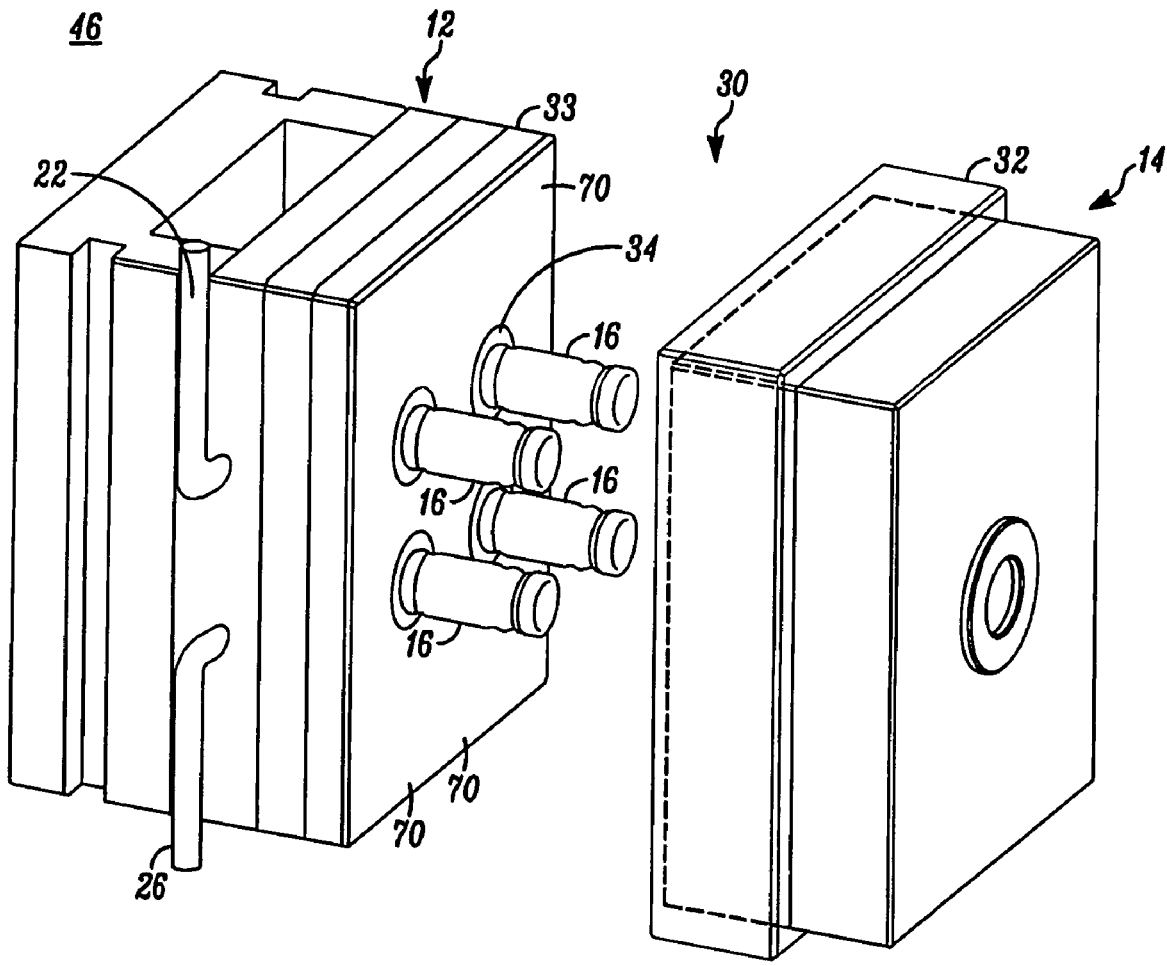
FIG. 2 is a perspective view of the first and second mold portions of the apparatus of FIG. 1 in a fully-open position for de-molding parts therefrom.
Figure 3:
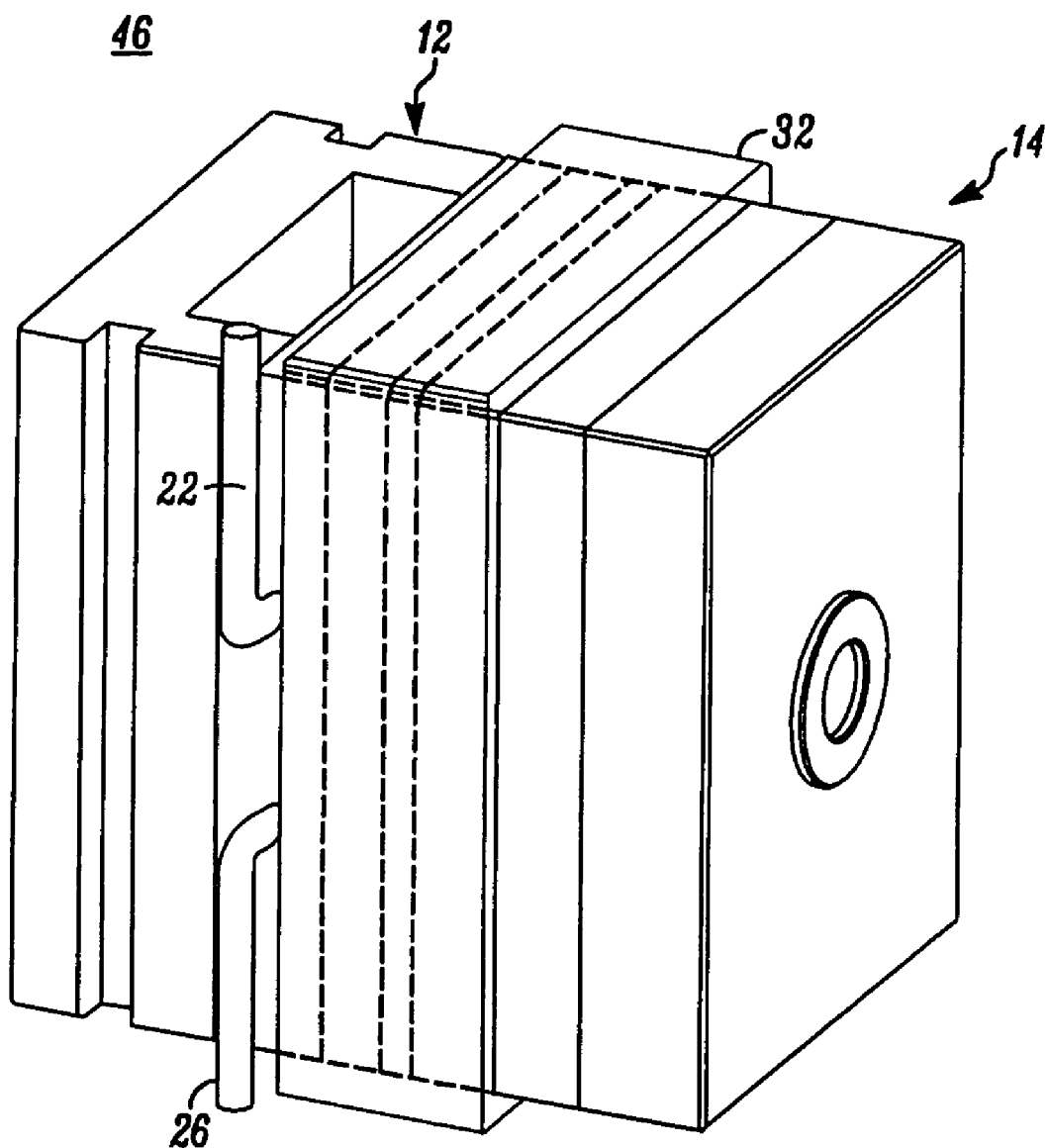
FIG. 3 is a perspective view of the first and second mold portions of the apparatus of FIG. 1 in a closed position for molding the sterile parts therein.
Figure 4:
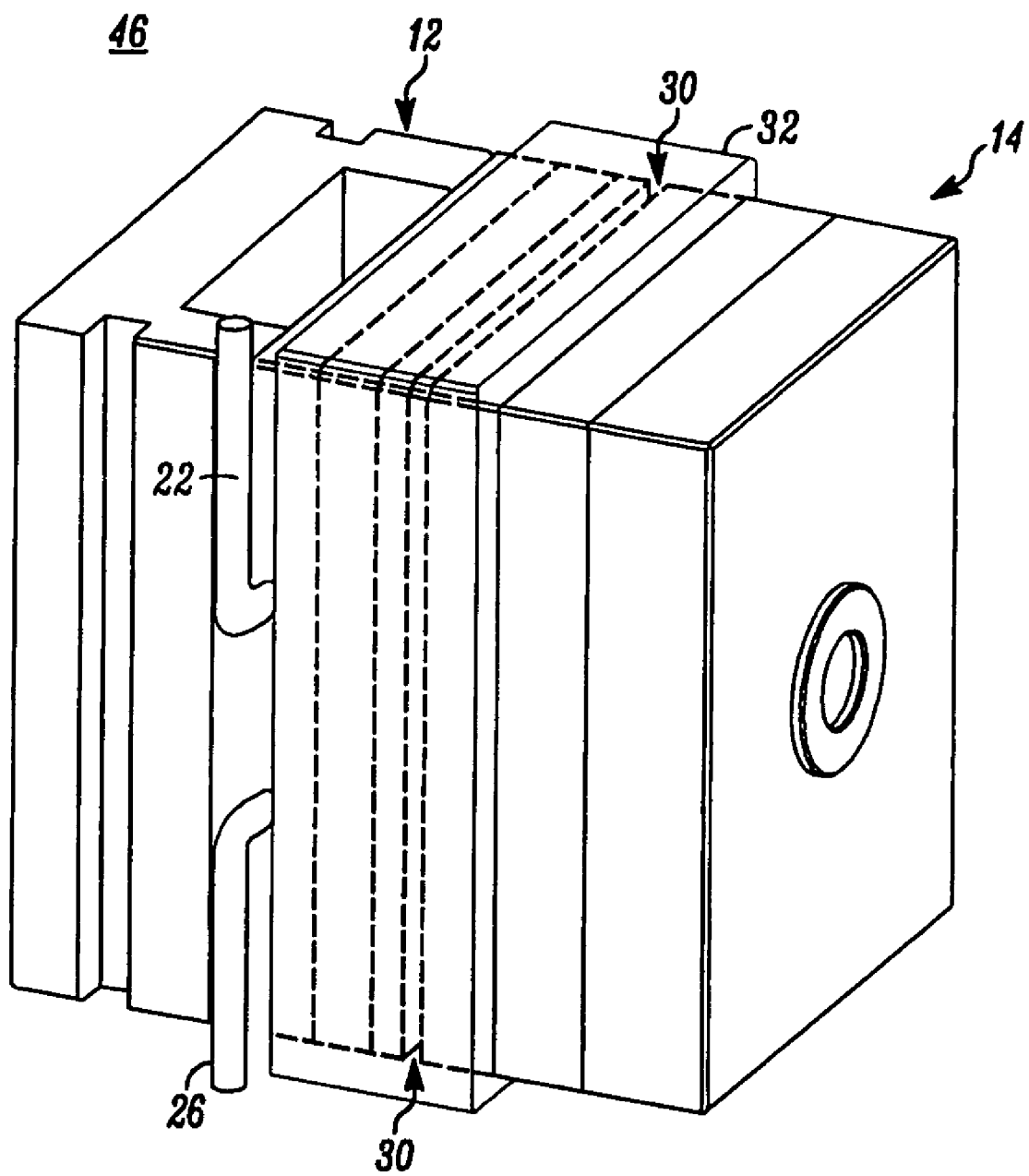
FIG. 4 is a perspective view of the first and second mold portions of the apparatus of FIG. 1 in a first or partially-open position defining a fluid passageway between the first and second mold portions for receiving therein a fluid sterilant for sterilizing the surfaces of the molds defining the passageway, but substantially preventing the fluid sterilant from contacting the interior surfaces of the parts that already are thermally sterilized at the time of formation by the introduction of molten plastic into the respective mold cavities.
Figure 5:
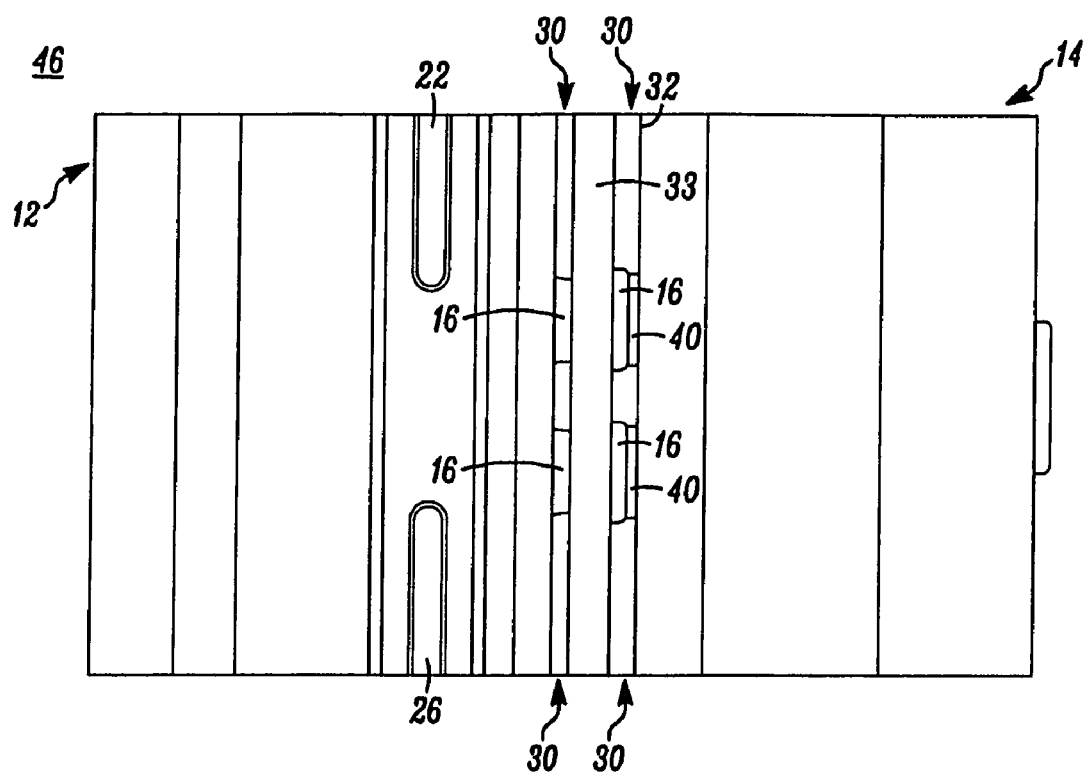
FIG. 5 is a cross-sectional view of the first and second mold portions in the first or partially-open position of FIG. 4 showing the fluid-passageway formed in the gap between the opposing faces of the mold portions for receiving the fluid sterilant therein.
Figure 6:
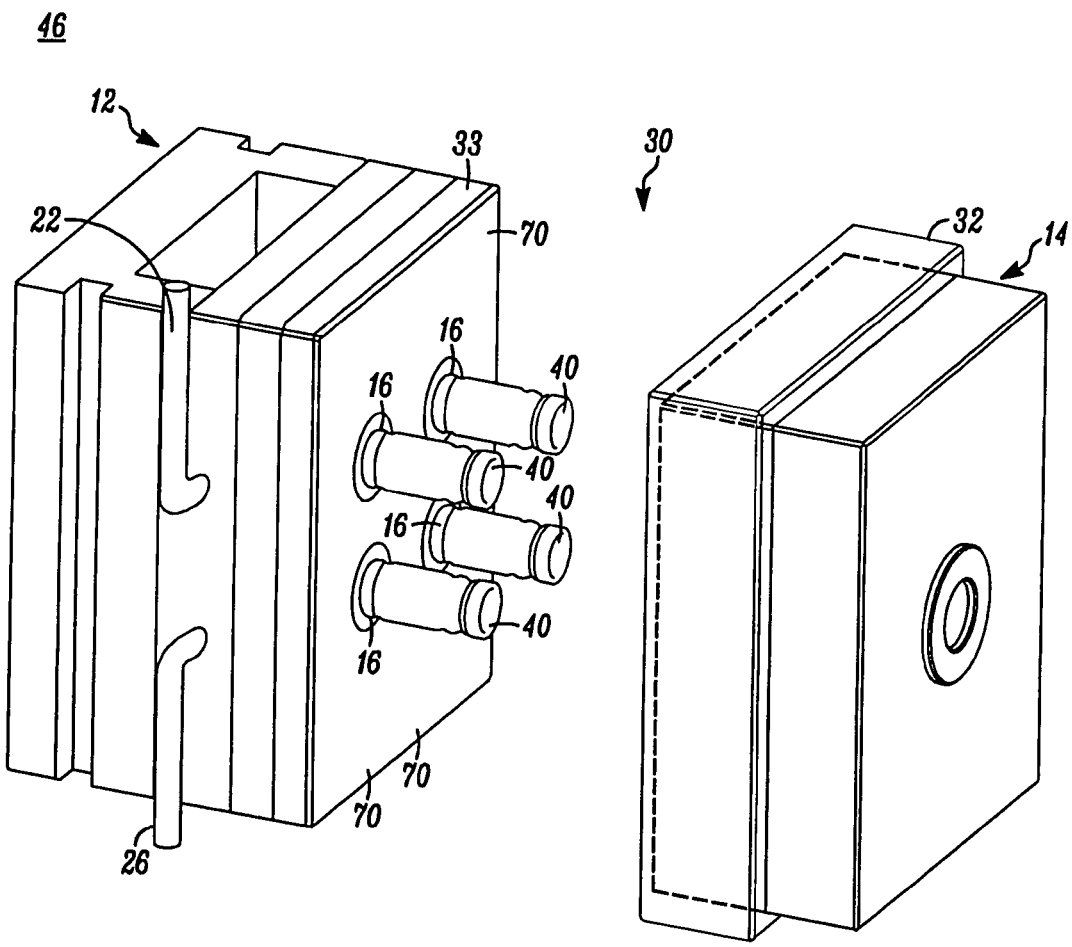
FIG. 6 is a perspective view of the first and second mold portions in the second or fully-opened position of the mold for de-molding the sterile parts therefrom.
Figure 7:
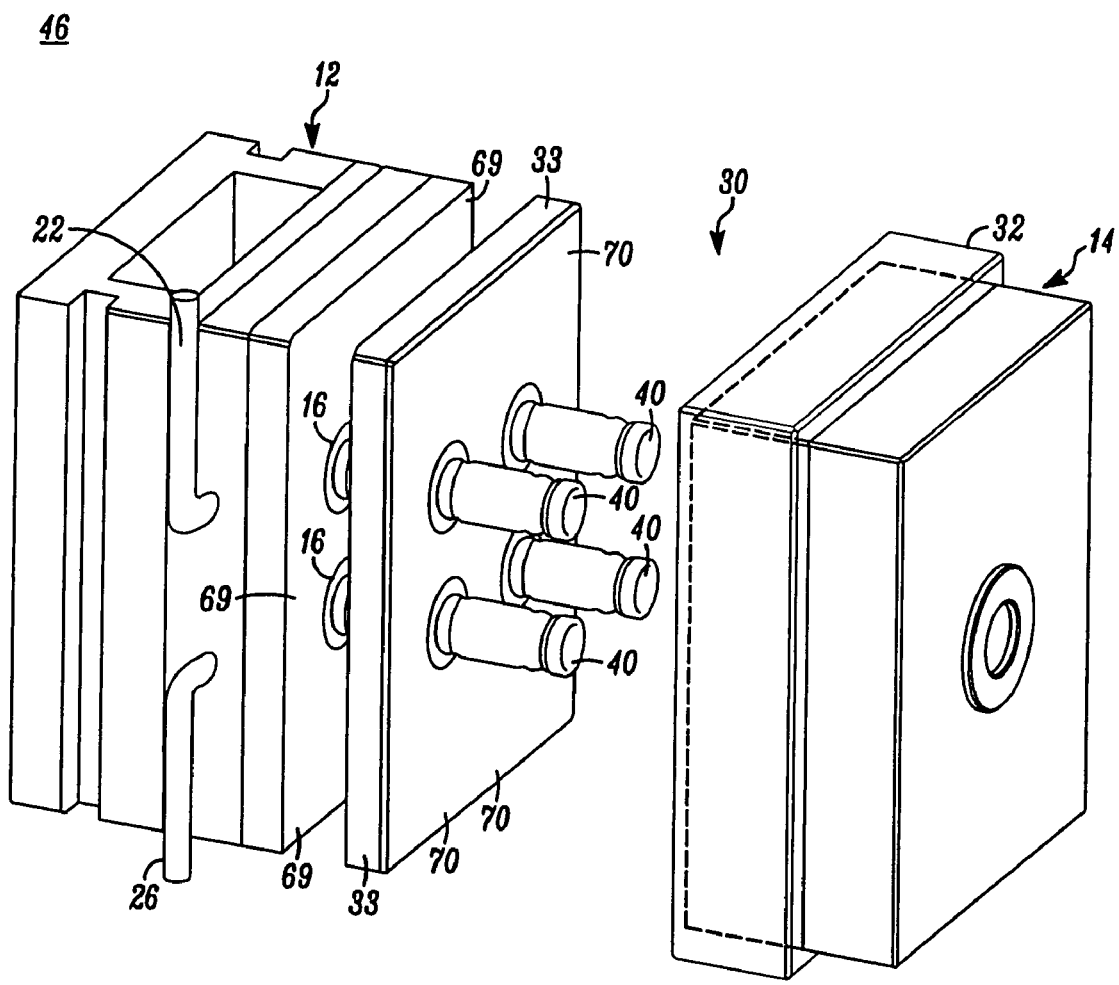
FIG. 7 is a perspective view of the first and second mold portions in the second or fully-opened position showing the stripper plate spaced outwardly relative to the first mold portion for de-molding the sterile molded parts from the core pins of the first mold portion.

In the operation of the apparatus 10, and with reference to FIG. 3, the parts to be molded, such as containers and/or stoppers, are formed by locating the first and second mold portions 12 and 14 in the closed position, and introducing molten plastic into the mold cavity spaces formed between the core pins 16 and respective mold cavities 18. As mentioned above, the introduction of molten plastic into the mold cavity spaces thermally sterilizes the surfaces that contact the plastic, or contributes to maintaining such surfaces sterile, and thus the surfaces of the container parts are sterile at the time of formation. As shown in FIGS. 4 and 5, prior to de-molding the container parts, one or both of the mold portions 12 and 14 are moved into a first or partially-open position defining the fluid passageway 30 in the gap formed between the mold portions. Then, a fluid sterilant, such as vaporized hydrogen peroxide, is introduced from the sterilant source 20 (FIG. 1) through the inlet line 22 and into the fluid passageway 30. As shown in FIG. 5, in the partially-open position, the stripper plate 33 is spaced relative to, and between the opposing faces of the mold portions 12 and 14 to thereby define the fluid passageway 30 on both sides of the stripper plate. As shown in FIG. 7, the first mold portion 12 defines on its front face a plurality of fluid-flow apertures 69 spaced relative to each other. The fluid-flow apertures 69 are coupled in fluid communication with the inlet port 22 for introducing the fluid sterilant into the fluid passageway 30 at the start of each fluid sterilization cycle, and a plurality of the fluid-flow apertures 69 are coupled in fluid communication with the outlet port 26 for drawing the fluid sterilant out of the fluid passageway 30 at the end of each fluid sterilization cycle. As can be seen, the fluid-flow apertures 69 are distributed relative to each other about the face of the first mold portion 12 in a manner that facilitates relatively rapid and uniform distribution of fluid sterilant from the inlet port 22 throughout the fluid passageway 30 in order to ensure sterilization of all surfaces of interest, and to subsequently relatively rapidly and thoroughly remove such fluid sterilant through the fluid outlet 26 at the end of each fluid sterilization cycle. As shown in FIGS. 2 and 6, the stripper plate 33 defines a plurality of fluid-flow apertures 70 formed therethrough to allow the fluid sterilant to flow through the stripper plate, fill the fluid passageway 30, and thereby contact the opposing surfaces of the mold portions and stripper plate defining the passageway. The fluid sterilant, such as vaporized hydrogen peroxide, is introduced in the fluid passageway 30 in sufficient volume and/or concentration, and retained within the fluid passageway 30 for a sufficient period of time, to ensure that the surfaces of interest are sterilized. As may be recognized by those of ordinary skill in the pertinent art based on the teachings herein, the type, volume and concentration of sterilant, and the residence time of the sterilant within the fluid passageway may be varied as desired or otherwise required. As can be seen, the inlet port 22, fluid passageway 30, and outlet port 26 may be vertically positioned relative to each other to facilitate gravitational flow of fluid therethrough.

As can be seen typically in FIG. 5, in the first or partially-open position, the molded parts are still seated on the core pins, and therefore the fluid sterilant is prevented from contacting the interior surfaces of the molded parts, such as containers and/or stoppers. After the opposing mold surfaces and fluid passageway 30 are sterilized, the vacuum source 24 is actuated to draw the fluid sterilant out of the fluid passageway 30. In lieu of employing the vacuum source 24 to draw the fluid sterilant out of the fluid passageway 30, or in addition to using vacuum, an over pressure of sterile gas, such as filtered air may be introduced through the inlet port 22 to flush the fluid sterilant through the fluid passageway 30 and outlet port 26. If desired, the sterile air or other gas may be heated to a temperature above the ambient temperature to facilitate evaporation and removal of the sterilant from the passageway and/or mold surfaces. Then, as shown in FIG. 6, the first and second mold portions 12 and 14 are moved into the second or fully-open position to allow de-molding of the sterile parts. As described above, the laminar flow source 48 directs the substantially laminar flow of sterile gas into and, in turn, throughout the aseptic enclosure 46. Accordingly, in the second or fully-open position of the first and second mold portions 12 and 14, respectively, and as shown typically in 6, the space between the molds is maintained sterile upon fully-opening the molds. Because the opposing surfaces of the mold portions are sterilized by contact with the fluid sterilant, the surfaces of the molded parts are thermally sterilized at the time of formation by the heat of the molten plastic, and the sterile gas source maintains an aseptic space between and adjacent to the mold portions, the sterile container parts are sterile at the time of de-molding and are maintained sterile within the aseptic enclosure 46. As indicated above, although the over pressure of sterile air is shown in FIG. 1 as being directed vertically through the enclosure 46 and the space 30 between the mold portions, it may be directed laterally or in another desired direction. In addition, in at least some applications, the flow of sterile air or other gas need not be substantially laminar, but rather may constitute a non-laminar overpressure of such gas.

Figure 8:
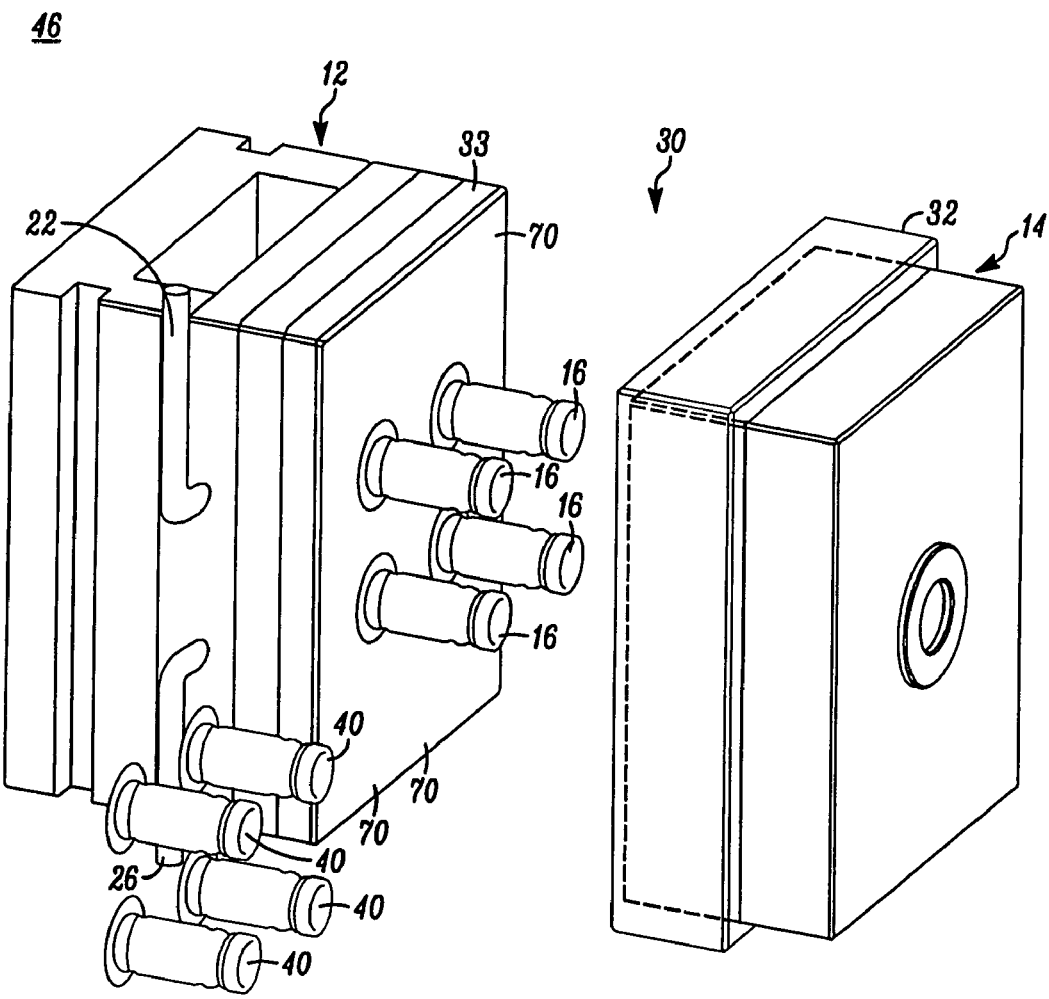
FIG. 8 is a perspective view of the first and second mold portions of FIG. 7 showing the sterile molded parts being removed from the molds in a sterile space formed between and adjacent to the mold by a substantially laminar flow and/or overpressure of sterile gas therethrough.
Figure 8A:
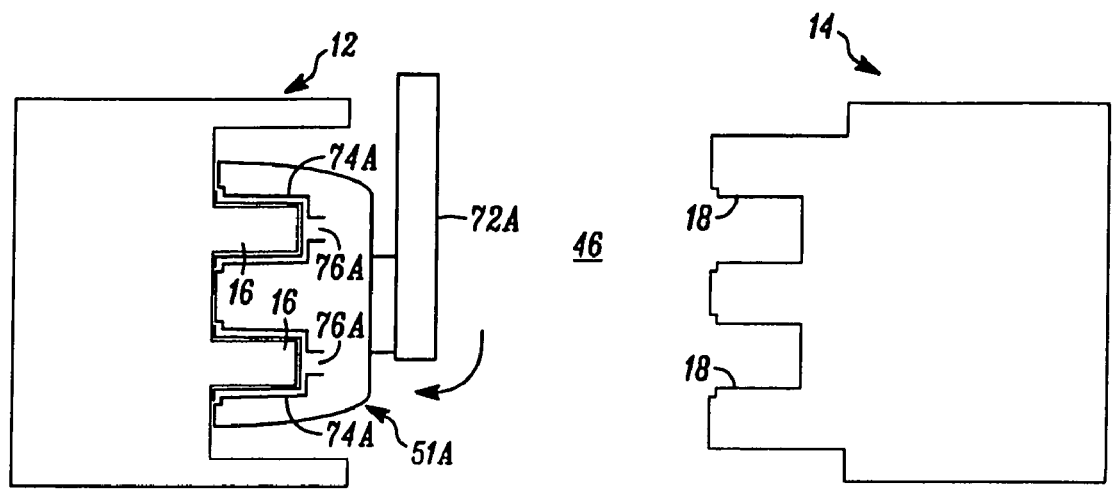
FIG. 8A is a somewhat schematic, cross-sectional view of the first and second mold portions showing the end-of-arm tooling of the automated assembly device engaging the molded parts on the core pins during de-molding.
Figure 8B:
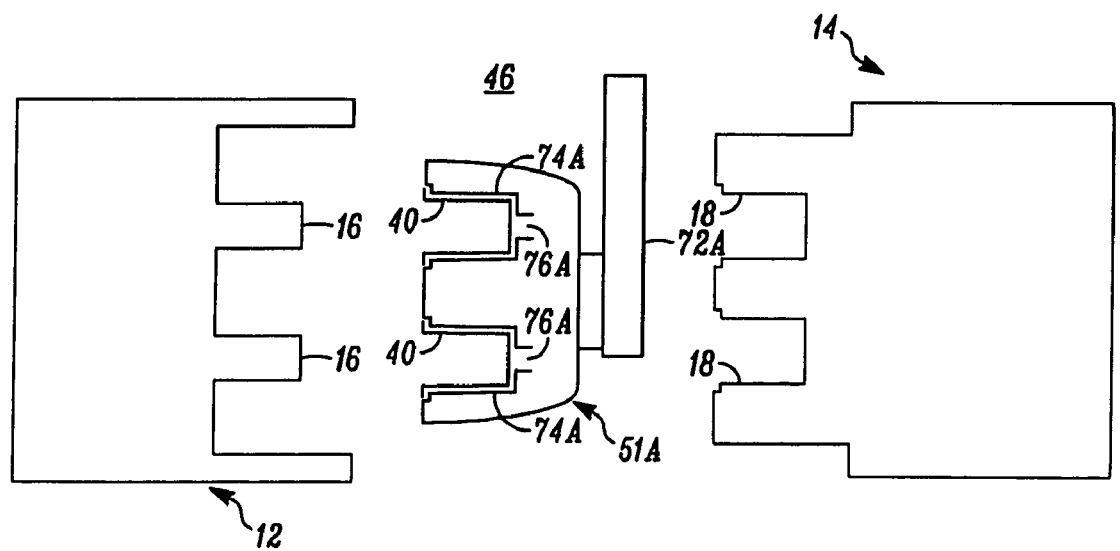
FIG. 8B is a somewhat schematic, cross-sectional view of the first and second mold portions showing the end-of-arm tooling engaging the sterile molded parts and transferring them within the sterile space between the mold portions.
Figure 9:
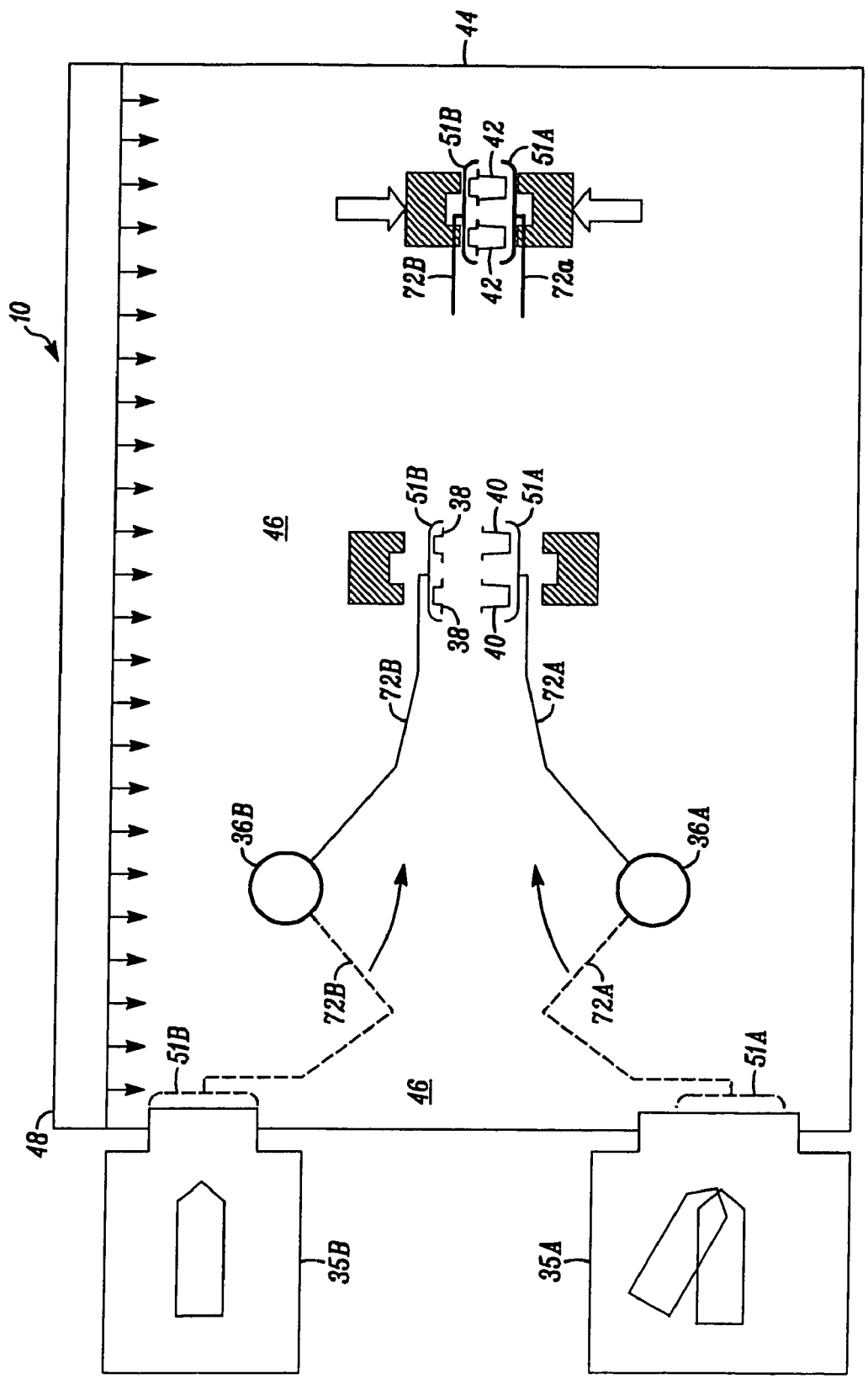
FIG. 9 is a schematic illustration showing dual molding machines mounted partially outside of, and partially within the barrier enclosure, and dual automated assembly devices mounted in line with the respective molding machines for de-molding and assembling within the aseptic interior of the barrier enclosure the containers and stoppers into sealed, empty container and stopper assemblies, and transferring the sealed empty sterile containers to the transfer station and/or needle filling and thermal resealing station.

As shown in FIG. 7, in order to de-mold the molded parts, such as the containers 40, the stripper plate 33 is moved outwardly relative to the first mold portion 12 to release or de-mold the containers from the core pins. As shown in FIGS. 8A, 8B and 9, the automated assembly devices 36A and 36B each includes end-of-arm tooling 51A, 51B mounted on a respective assembly arm 72A, 72B. Upon opening the mold portions into the fully-open position, and as indicated by the arrow in FIG. 8A, the respective assembly arm 72A or 72B is moved into a de-molding position between the first and second mold portions and aligned with the molded parts to engage and facilitate de-molding the parts. The assembly arms 72A and 72B may be robotic arms, as described above, or may be another type of automated or semi-automated assembly arm configured to perform the function of the assembly arms as described herein. As shown in FIG. 8A, the end-of-arm tooling 51A, 51B each includes a plurality of molded part cavities 74A, 74B for receiving therein and engaging the molded parts and removing them from the molds. The illustrated molded part cavities 74A, 74B include vacuum ports 76A, 76B that are each coupled to a vacuum source (not shown) for releasably securing the molded parts within the cavities to thereby facilitate de-molding the parts, retaining the parts on the end-of-arm tooling during manipulation and assembly thereof, and releasing the parts during or following assembly. As shown in FIG. 8B, once the molded parts 40 are engaged by vacuum or otherwise releasably secured within the respective end-of-arm tooling 51A, 51B, the respective assembly arm 72A, 72B is moved out of the space 30 between the molds to assemble the parts and/or transport them into an aseptic enclosure for transport and/or storage. If desired, a plurality of molding cycles may be performed between the sterilization cycles. For example, the flow of sterile air or other gas within the aseptic enclosure 46 may be sufficient to maintain the mold surfaces and space 30 between the mold portions sterile throughout a plurality of molding and de-molding cycles between successive sterilization cycles.

Figure 10A:
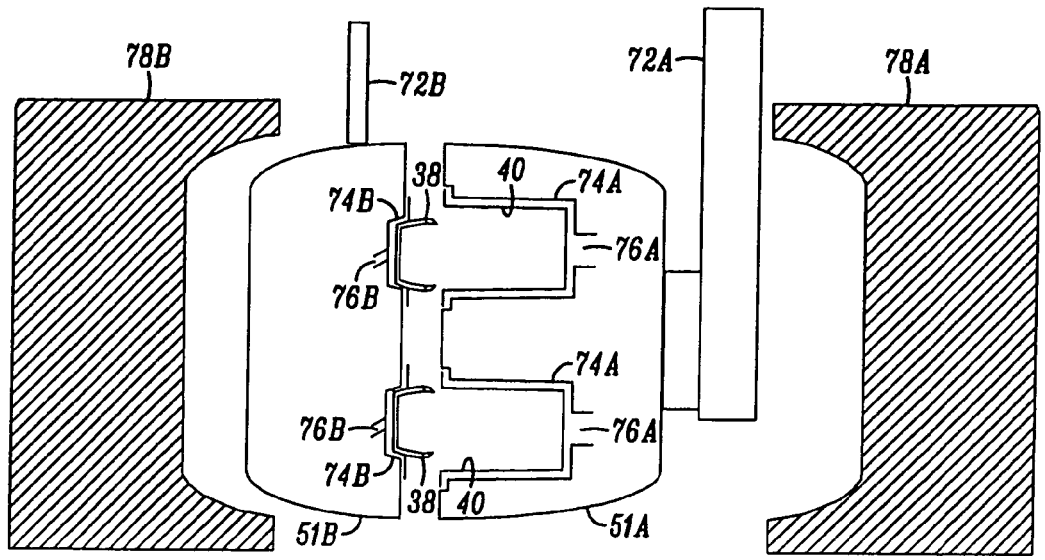
FIG. 10A is a somewhat schematic illustration of the opposing end-of-arm tools of the dual automated assembly devices immediately prior to assembling the sterile stoppers and corresponding containers.
Figure 10B:
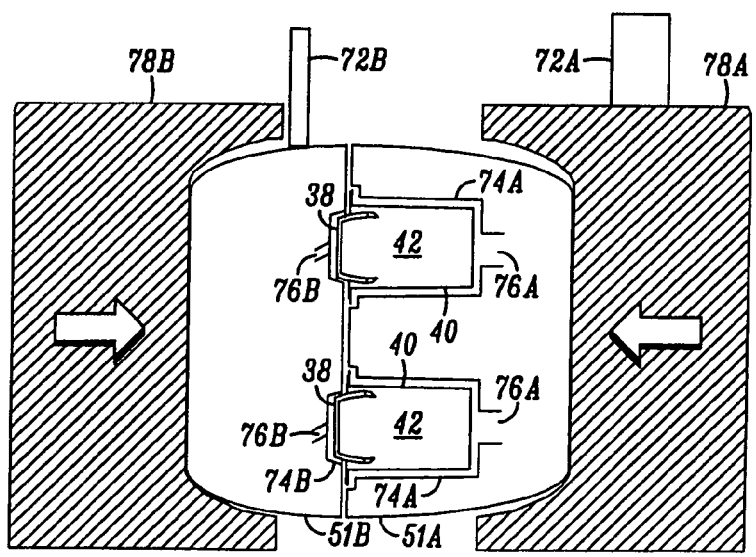
FIG. 10B is a somewhat schematic illustration of the end-of-arm tools of FIG. 10A showing the assembly of the stoppers and containers into sterile, sealed, empty container and stopper assemblies.

As shown in FIG. 9, the apparatus 10 may include dual automated assembly devices 36A, 36B wherein each automated assembly device is associated with a respective molding machine 35A, 35B or mold. Alternatively, the apparatus 10 may include one assembly device for plural mold, or plural molds and assembly devices. In addition, if desired when forming stopper and container assemblies, the stoppers and containers may be molded in different cavities in the same molds. As may be recognized by those of ordinary skill in the pertinent art based on the teachings herein, the apparatus and method of the invention may include any of numerous different configurations of molding machines, molds and assembly devices. In the illustrated embodiment of FIG. 9, the apparatus 10 includes a molding machine 35A and associated mold portions for molding the containers 40, and molding machine 35B and associated mold portions for molding the stoppers or stopper and cap assemblies 38. Also in the illustrated embodiment, each molding machine 35A and 35B is paired with a respective automated assembly device 36A and 36B, respectively, and each assembly device includes a respective assembly arm 72A and 72B, and respective end-of-arm tooling 51A and 51B. As shown in FIG. 9, the containers 40 and stoppers 38 are molded side by side, and de-molded and assembled by the dual automated assembly devices 36A and 36B within the aseptic enclosure 46 to thereby form sealed, sterile, empty container and stopper assemblies or other desired parts or devices. As shown in FIGS. 10A and 10B, the apparatus 10 may include opposing clamps 78A and 78B that engage the end-of-arm tools 51A and 51B, respectively, and move the end-of-arm tools toward each other to, in turn, insert the stoppers 38 within the corresponding openings of the containers 40. Once the stoppers 38 are received within the containers 40, the clamps 78A and 78B are withdrawn, and the sterile, sealed, empty container and stopper assemblies 42 are released by the end-of-arm tooling 51A and 51B into the transfer station 52 (FIG. 1) for subsequent needle filling and laser resealing in the needle filling and thermal resealing station 54 (FIG. 1).

Figure 11A:
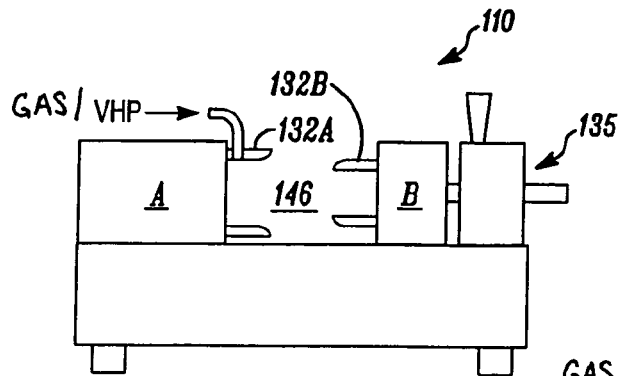
FIGS. 11A through 11D are somewhat schematic, side elevational views of another embodiment of the present invention wherein a molding machine includes a barrier enclosure or cover that is movable between a closed position surrounding the first and second mold portions and forming an aseptic or sterile space therein, and an open position allowing an overpressure of sterile or aseptic gas to flow therethrough during de-molding of the parts.
Figure 11B:
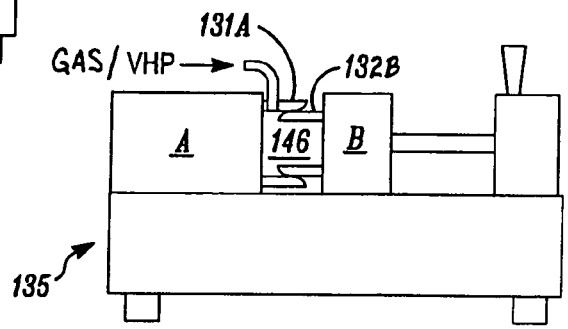
Figure 11C:
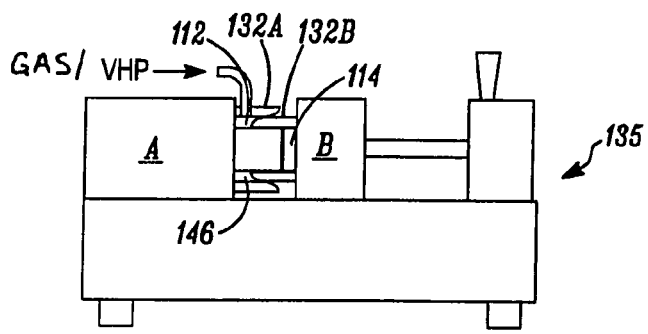
Figure 11D:
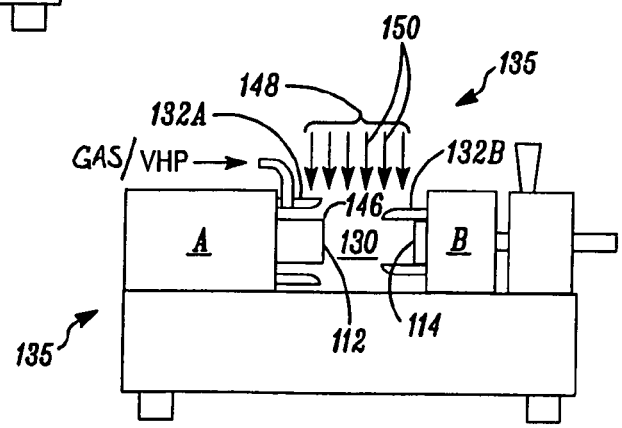

The apparatus and method of the present invention may include any of the numerous devices, components, features and processes disclosed in the following patents and patent applications: International PCT Patent Application entitled "Apparatus And Method For Molding And Assembling Containers With Stoppers And Filling Same", filed on Mar. 8, 2005 and accorded application no. PCT/US2005/007916; U.S. Provisional Patent Application Ser. No. 60/551,565, filed Mar. 8, 2004, entitled "Apparatus And Method For Molding And Assembling Containers With Stoppers And Filling Same"; U.S. Patent Application entitled "Apparatus For Molding And Assembling Containers With Stoppers And Filling Same", filed on Mar. 7, 2005 and accorded application Ser. No. 11/074,454; U.S. Patent Application entitled "Method For Molding And Assembling Containers With Stoppers And Filling Same", filed on Mar. 7, 2005 and accorded application Ser. No. 11/074,513; U.S. patent application Ser. No. 10/766,172 filed Jan. 28, 2004, entitled "Medicament Vial Having A Heat-Sealable Cap, And Apparatus and Method For Filling The Vial", which is a continuation-in-part of similarly titled U.S. patent application Ser. No. 10/694,364, filed Oct. 27, 2003, now U.S. Pat. No. 6,805,170, which is a continuation of similarly titled co-pending U.S. patent application Ser. No. 10/393,966, filed Mar. 21, 2003, now U.S. Pat. No. 6,684,916, which is a divisional of similarly titled U.S. patent application Ser. No. 09/781,846, filed Feb. 12, 2001, now U.S. Pat. No. 6,604,561, which, in turn, claims the benefit of similarly titled U.S. Provisional Application Ser. No. 60/182,139, filed Feb. 11, 2000; similarly titled U.S. Provisional Patent Application No. 60/443,526, filed Jan. 28, 2003; similarly titled U.S. Provisional Patent Application No. 60/484,204, filed Jun. 30, 2003; U.S. patent application Ser. No. 10/655,455, filed Sep. 3, 2003, entitled "Sealed Containers And Methods Of Making And Filling Same"; U.S. Provisional Patent Application Ser. No. 60/518,685, entitled "Needle Filling And Laser Sealing Station"; the U.S. Provisional Patent Application filed Mar. 5, 2004 and accorded application No. 60/550,805, entitled "Apparatus For Needle Filling And Laser Resealing"; and U.S. Provisional Patent Application Ser. No. 60/660,395, filed Mar. 11, 2005, entitled "Apparatus And Method For Aseptically Molding And Assembling Containers With Heated Surfaces, And Filling Same". The foregoing patent applications and patents are assigned to the Assignee of the present invention and are hereby expressly incorporated by reference as part of the present disclosure FIGS. 11A through 12D, another apparatus embodying the present invention is indicated generally by the reference numeral 110. The apparatus 110 is similar in many respects to the apparatus 10 described above, and therefore like reference numerals preceded by the numeral "1" are used to indicate like elements. A primary difference of the apparatus 110 in comparison to the apparatus 10 above is that instead of the movable cover 32 mounted on one of the mold portions, the apparatus 110 includes a two-part cover assembly 132A, 132B mounted on opposing sides of the molding machine 135. As can been, the two-part cover assembly 132A, 132B includes a first cover portion 132A mounted on the "A" side of the molding machine 135, and a second cover portion 132B mounted on the "B" side of the molding machine. Accordingly, in this embodiment of the present invention, the mold portions 112 and 114 may be conventional molds, whereas the molding machine 135 is modified to include the two-part cover 132A, 132B, and as described further below, the associated sterile gas and fluid sterilant inlet and outlet ports. As shown in FIGS. 11A and 11B, prior to installation of the respective mold 112, 114, the molding machine 135 includes the first cover part 132A mounted on the stationary or "A" side of the molding machine, and the second cover part 132B mounted on the "B" side or moving part of the molding machine. In the fully open position shown in FIG. 11A, and the closed position shown in FIG. 11B, the two-part cover assembly 132A, 132B defines an aseptic interior enclosure 146. As shown in FIGS. 11C and 11D, the mold portions 112, 114 are mounted to the sides A and B, respectively, of the molding machine 135 within the aseptic enclosure 146 of the two-part cover assembly 132A, 132B. As shown in FIG. 11D, the apparatus 110 includes a source 148 of sterile air or other gas mounted either above, or laterally with respect to the two-part cover assembly 132A, 132B for introducing a substantially laminar flow of sterile air or other gas, and/or a non-laminar overpressure of such sterile air or other gas, into the aseptic enclosure 146 when located in the fully open position.

Figure 12A:
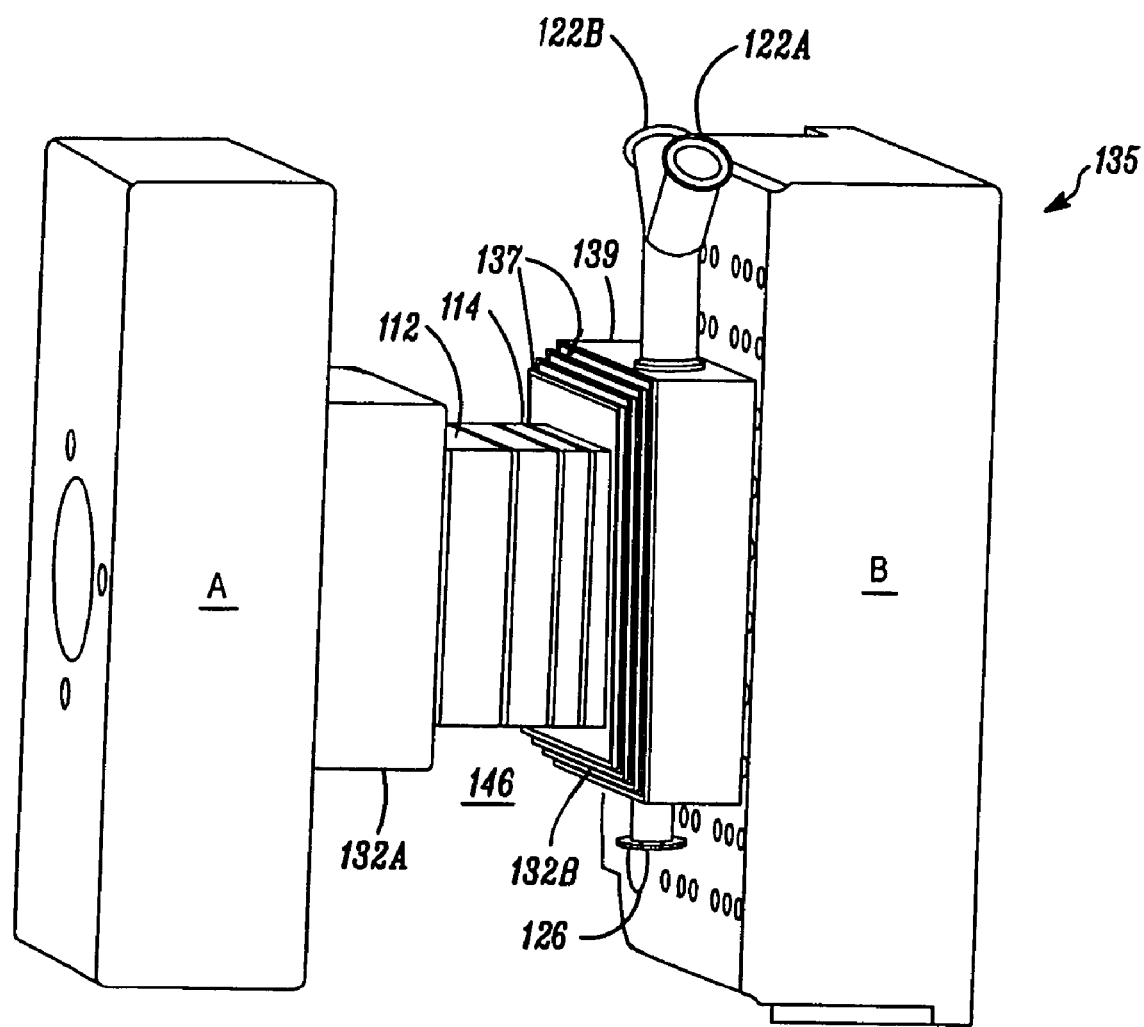
FIGS. 12A through 12D are perspective views of the first and second mold portions of the molding machine of FIGS. 11A through 11D showing in FIG. 12A the mold closed and ready to start the molding cycle; showing in FIG. 12B the barrier enclosure or cover surrounding the first and second mold portions during molding of the parts; showing in FIG. 12C the first and second mold portions in the partially-open position for introduction of the fluid disinfectant or sterilant into the interior of the barrier enclosure or cover and into the space between the first and second mold portions, and the subsequent introduction of sterile gas into the interior of the cover to exhaust the fluid disinfectant or sterilant; and showing in FIG. 12D the mold portions in the fully-open position, the barrier enclosure or cover retracted and the flow of sterile gas through the space between the mold portions during de-molding of the parts therefrom.
Figure 12B:
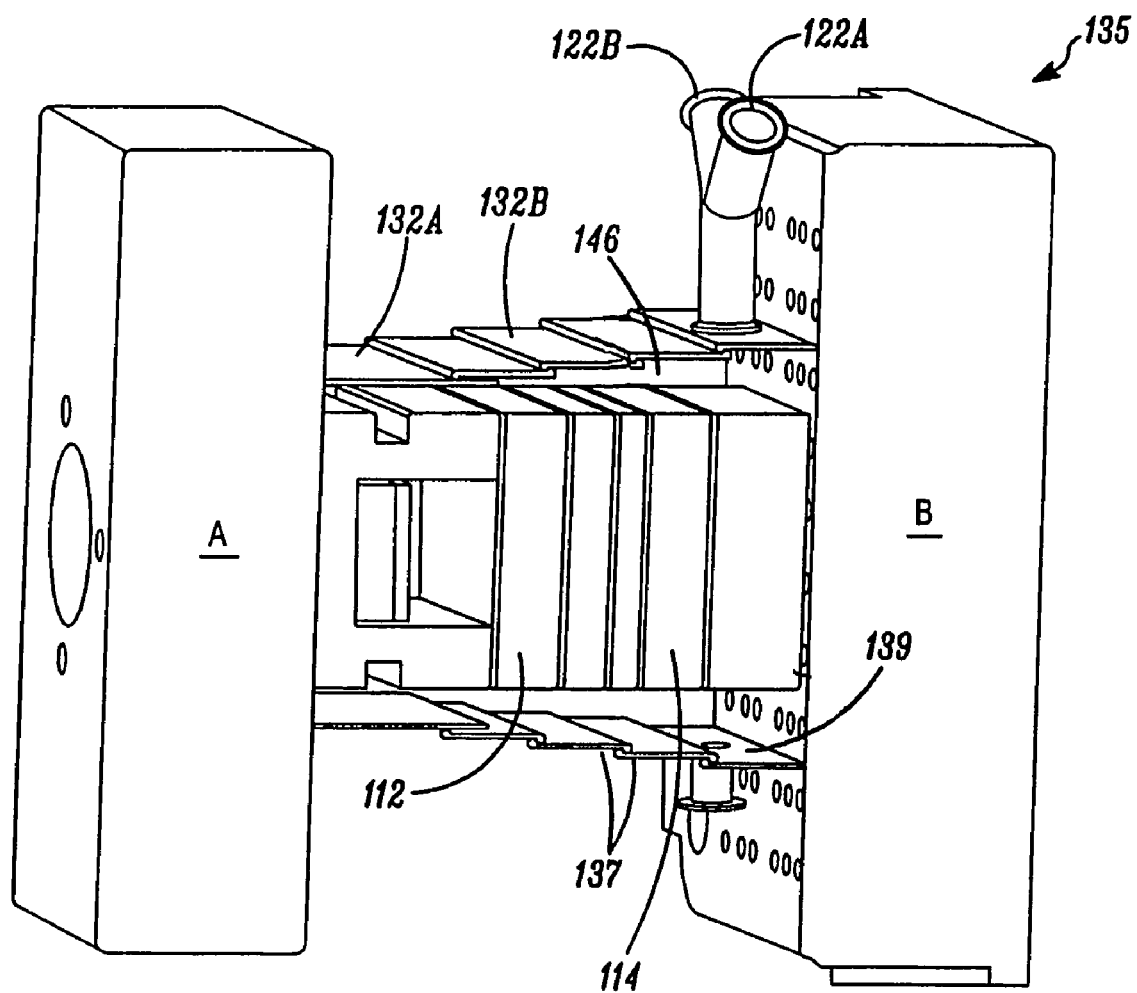
Figure 12C:
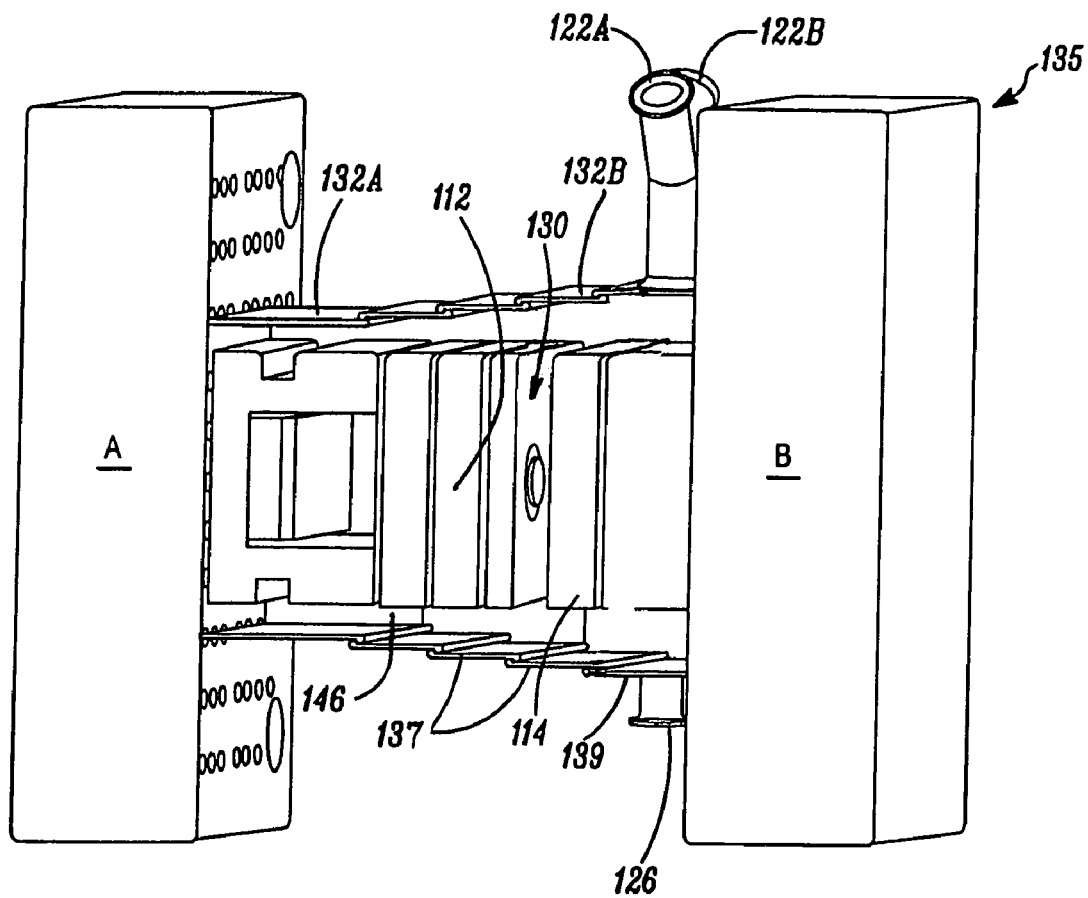
Figure 12D:
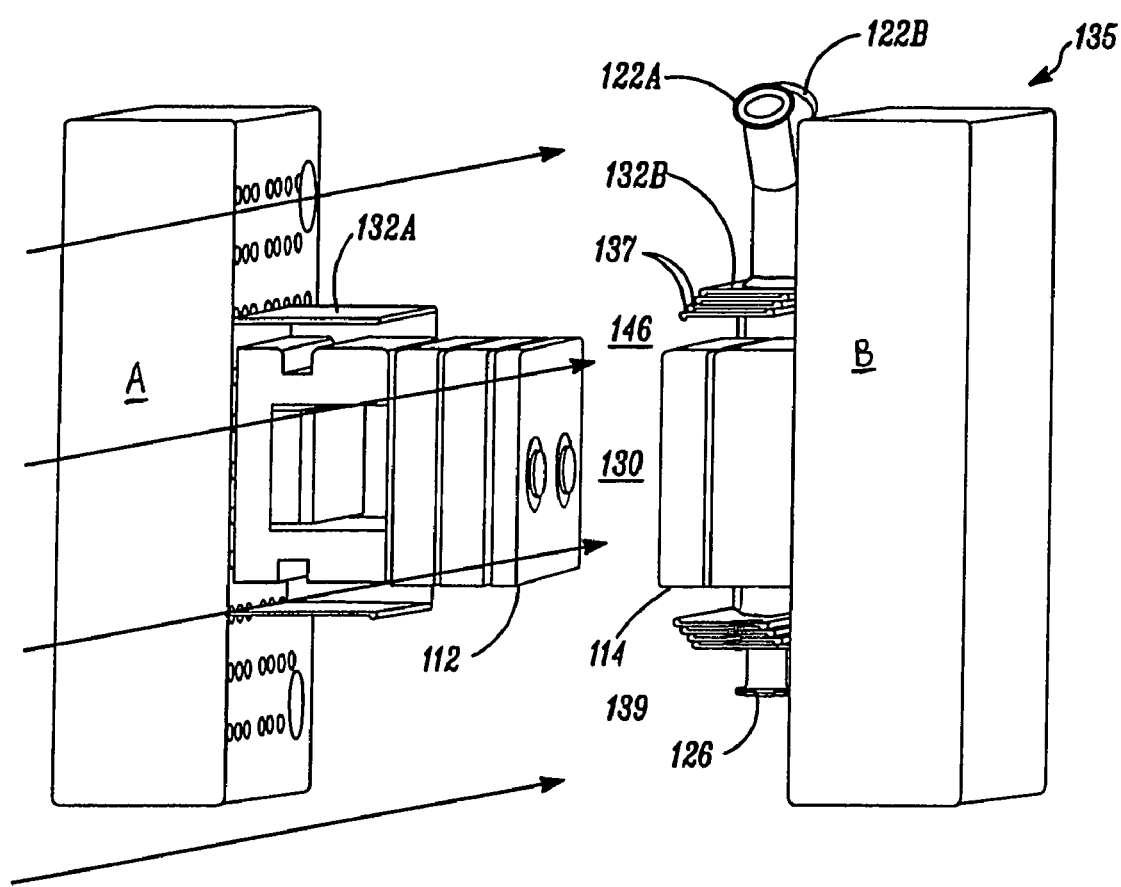

Turning to FIGS. 12A through 12D, the second cover part 132B is movable relative to the first cover part 132A between an open position for the de-molding cycles, as shown in FIGS. 12A and 12D, and a closed position for the molding and fluid sterilization cycles, as shown in FIGS. 12B and 12C. In the illustrated embodiment, the second cover part 132B defines a telescoping construction including a plurality of overlapping second cover parts 137 that telescope outwardly into sealing engagement with the first cover part 132A in the closed position (FIGS. 12B and 12C), and that telescope inwardly into the base portion 139 of the second cover part 132B in the open position (FIGS. 12A and 12D). A drive unit (not shown) of a type known to those of ordinary skill in the pertinent art is drivingly coupled to the second cover part 132B to drive the second cover part between the open and closed positions. In the closed position, as shown in FIGS. 12B and 12C, the two-part cover assembly 132A, 132B defines an enclosed aseptic space 146 surrounding the mold portions 112, 114. A fluid sterilant is introduced through a sterilant inlet port 122A to sterilize the space 146 and the passageway 130 formed between the mold portions when in the partially-open position (FIG. 12C). An overpressure of sterile gas, such as sterile air, is introduced through a gas inlet port 122B to flush the fluid sterilant out of the aseptic space 146 surrounding the mold portions 112, 114 and the fluid passageway 130 between mold portions, and in turn through the outlet port 126. If desired, the sterile air or other gas may be heated to a predetermined temperature above the ambient temperature to facilitate evaporation and removal of the fluid sterilant through the outlet port 126. Also, if desired, a vacuum source (not shown) may be coupled in fluid communication with the outlet port 126 and used in lieu of the over pressure of sterile air or other gas, or used in addition thereto, to exhaust the fluid sterilant from the aseptic enclosure 146.

In the operation of the apparatus 110, and in order to start the molding cycle, the mold halves 112, 114 are closed as shown in FIG. 12A. When the mold is first closed as shown in FIG. 12A, the two-part cover assembly 132A, 132B is located in the open position (typically due to de-molding the previous set of molded parts). In the open position of the cover 132A, 132B, the flow source 148 (FIG. 11D) directs an overpressure of sterile air or other gas through the aseptic space 146 to maintain the space and mold surfaces aseptic. This flow of sterile air or other gas may be substantially laminar, or may simply provide an overpressure to maintain the space 146 and mold surfaces aseptic during de-molding of the parts and otherwise when the two-part cover assembly 132A, 132B is in the open position. Then, during the molding or injection cycle, the second cover part 132B is telescoped outwardly into sealing engagement with the first cover part 132A to sealingly enclose the aseptic space 146 surrounding the mold portions 112, 114 and thereby maintain the space 146 aseptic during the molding cycle. After the parts are molded (i.e., the respective molding cycle is completed), and as shown in FIG. 12C, the fluid sterilization cycle may be initiated. During the fluid sterilization cycle, the second mold portion 114 is moved slightly away from the first mold portion 112 into the partially-open position, and the fluid sterilant, such as VHP, is introduced through the fluid sterilant inlet 122A and, in turn, throughout the aseptic enclosure 146 and passageway 130 formed between the two mold portions 112, 114. The fluid sterilant is introduced in sufficient volume and concentration, and is allowed to reside in the enclosure 146 and passageway 130 for a sufficient period of time, to ensure sterilization of the mold surfaces, the passageway between the mold portions, and the enclosure. Then, to complete the sterilization cycle, an over pressure of sterile air or other gas may be introduced through the sterile gas inlet port 122B and, in turn, through the enclosure 146 and passageway 130 to flush the fluid sterilant through the outlet port 126. The over pressure of sterile air or other gas is allowed to flow for a sufficient period of time to ensure removal of substantially all of the fluid sterilant from the mold surfaces, passageway and enclosure. As indicated above, the sterile air or other gas may be heated to a predetermined temperature above the ambient temperature to facilitate dehumidification of the enclosure and passageway and to otherwise facilitate the removal of substantially all fluid sterilant therefrom.

Upon completion of the sterilization cycle, and as shown in FIG. 12D, the de-molding cycle is initiated. During the de-molding cycle, the parts are de-molded by moving the second cover part 132B away from the first cover part 132A and into the open position, and by moving the second mold portion 114 further away from the first mold portion 112 into the fully open position. As indicated by the arrows in FIG. 12D, the flow source directs an overpressure of sterile air or other gas laterally or horizontally through the aseptic space 146 to maintain the space and mold surfaces aseptic throughout the de-molding cycle. As described above in connection with the apparatus 10, the molded parts may be de-molded by aseptically picking the parts from the mold 112, 114 with a robot or other automated tooling, or by ejecting the molded parts into a sterile bag or other container (not shown) located below or otherwise adjacent to the mold 112, 114 to receive and hold the molded parts in a sterile condition. In the illustrated embodiment, the molding and de-molding cycles may be repeated a predetermined number of times without performing the sterilization cycle therebetween. The predetermined number of such molding and de-molding cycles between sterilization cycles is determined to ensure a sufficient margin of safety such that the enclosure 146 and mold surfaces are maintained sterile to, in turn, ensure the sterility of the de-molded parts. Then, when the predetermined number of molding/de-molding cycles is reached, the sterilization cycle is run between respective molding and de-molding cycles to ensure that the enclosure 146 and mold surfaces are maintained sterile throughout the next predetermined number of molding/de-molding cycles.

As may be recognized by those skilled in the pertinent art based on the teachings herein, numerous changes and modifications may be made to the above-described and other embodiments of the present invention without departing from its scope as defined in the appended claims. For example, one or more first mold cavities may be located within a first molding machine, one or more second mold cavities may be located within a second molding machine, and one or both of the first and second molding machines may include a transfer conduit connected between the outlet of the respective mold cavity and an aseptic enclosure for transferring at least one of the molded container body and stopper or other molded part(s) into the aseptic enclosure, and if desired, assembling the stopper and container body or other molded part(s) therein. In addition, the assembly device may be operatively coupled between one or both of the first mold cavity and the second mold cavity and a transfer station or a needle filling and laser sealing station (or like filling station) for transferring assembled stoppers and containers or other molded part(s) thereto. Still further, the apparatus and method of the present invention may be employed to mold and fill any of numerous different types of parts that may be used to make any of numerous different apparatus, including any of numerous different types of containers that may include any of the numerous different configurations of stoppers and/or other features, or any of numerous different other devices, such as implantable devices. In addition, the assembled containers can be filled with any of numerous different products, including pharmaceuticals, such as injectables, ophthalmic, and dermatological products, vaccines, liquid nutrition products, and food and beverage products. In addition, the apparatus and method of the present invention may use any of numerous different fluid disinfectants or sterilants that are currently known, or that later become known. Accordingly, this detailed description of preferred embodiments is to be taken in an illustrative, as opposed to a limiting sense.

What is claimed is:

1. A method of molding sterile parts, the method comprising:
   providing a first mold portion and a second mold portion, wherein at least one of the first and second mold portions defines a mold cavity configured to receive a molten plastic and form therefrom at least one molded part, and at least one of the first and second mold portions is movable relative to the other;
   introducing a molten plastic into the at least one mold cavity with the first and second mold portions in a closed position and forming at least one molded part therein;
   moving at least one of the first and second mold portions from the closed position to an open position defining a fluid passageway between the first and second mold portions and permitting the passage of fluid therein;
   introducing a fluid sterilant into the fluid passageway and into contact with at least one surface of the first and second mold portions located adjacent to the at least one mold cavity, but not in contact with an interior surface of a molded part formed within the mold cavity, and in turn sterilizing the at least one surface of the first and second mold portions and preventing contamination of the respective molded part; and
   de-molding from the at least one mold cavity the at least one molded part.

2. A method as defined in claim 1, further comprising directing an over pressure of sterile gas over at least a portion of the first and second mold portions and the at least one molded part during de-molding thereof.

3. A method as defined in claim 1, further comprising at least one of (i) drawing substantially all of the fluid sterilant out of the fluid passageway prior to de-molding the at least one part, and (ii) flushing substantially all of the fluid sterilant out of the fluid passageway prior to de-molding the at least one molded part.

4. A method as defined in claim 1, further comprising covering at least a peripheral portion of the fluid passageway during introducing the fluid sterilant therein to substantially retain the fluid sterilant within the fluid passageway and in contact with the surfaces of the first and second mold portions defining the fluid passageway.

5. A method as defined in claim 4, further comprising retaining the fluid sterilant in the fluid passageway for a predetermined period of time sufficient to sterilize same, and then at least one of drawing the fluid sterilant and flushing the fluid sterilant from the fluid passageway prior to de-molding the at least one molded part.

6. A method as defined in claim 1, further comprising providing an enclosure; directing at least one of an overpressure of sterile gas and a substantially laminar flow of sterile gas into the enclosure to thereby define a sterile space within the enclosure; and de-molding the at least one molded part within the sterile space.

7. A method as defined in claim 1, further comprising performing a plurality of molding and de-molding cycles without any sterilization cycles therebetween, wherein each molding cycle includes molding at least one respective molded part, each de-molding cycle includes de-molding at least one respective molded part, and each sterilization cycle includes introducing the fluid sterilant into the fluid passageway between respective molding and de-molding cycles.

8. A method as defined in claim 1, wherein introducing a fluid sterilant into the fluid passageway comprises introducing vaporized hydrogen peroxide into the fluid passageway.

* * * * *

UNITED STATES PATENT AND TRADEMARK OFFICE
CERTIFICATE OF CORRECTION

| | | |
|---|---|---|
| PATENT NO. | : 8,071,009 B2 | Page 1 of 1 |
| APPLICATION NO. | : 11/582291 | |
| DATED | : December 6, 2011 | |
| INVENTOR(S) | : Py et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 646 days.

Signed and Sealed this
Sixth Day of March, 2012

David J. Kappos
*Director of the United States Patent and Trademark Office*